United States Patent

Weaver et al.

[11] Patent Number: 5,194,571
[45] Date of Patent: Mar. 16, 1993

[54] COLORED POLYESTER COMPOSITIONS

[75] Inventors: Max A. Weaver; Clarence A. Coates; William W. Parham, all of Kingsport; Samuel D. Hilbert, Jonesborough; James J. Krutak; Wayne P. Pruett, both of Kingsport, all of Tenn.

[73] Assignee: Eastman Kodak Company, Rochester, N.Y.

[21] Appl. No.: 746,832

[22] Filed: Aug. 19, 1991

[51] Int. Cl.$^5$ .............................................. C08G 63/00
[52] U.S. Cl. ................................. 528/272; 528/288; 528/307; 528/308; 528/310; 528/335; 528/289; 528/290; 528/291
[58] Field of Search .............. 528/272, 288, 307, 308, 528/310, 335, 222, 289, 290, 291; 548/427

[56] References Cited

U.S. PATENT DOCUMENTS

| | | | |
|---|---|---|---|
| 2,762,810 | 9/1956 | Heckert | 546/166 |
| 3,013,013 | 12/1961 | Carboni | 548/468 |
| 3,096,339 | 7/1963 | Martin | 548/364 |
| 4,018,796 | 4/1977 | Harnisch | 549/288 |
| 4,267,306 | 5/1981 | Davis et al. | 528/226 |
| 4,359,570 | 11/1982 | Davis et al. | 528/289 |
| 4,373,102 | 2/1983 | Neumann et al. | 544/143 |
| 4,403,092 | 9/1983 | Davis et al. | 528/290 |
| 4,617,373 | 10/1986 | Pruett et al. | 528/288 |
| 4,684,271 | 8/1987 | Wellman et al. | 428/913 |
| 5,011,811 | 4/1991 | Shuttleworth et al. | 428/914 |

OTHER PUBLICATIONS

E. L. Martin et al., J. Org. Chem., 26, 2032 (1961).
R. W. Wiley & S. C. Slaymaker, J. Am. Chem. Soc., 80, 1385 (1958).

*Primary Examiner*—Nathan M. Nutter
*Assistant Examiner*—Jeffrey Culpeper Mullis
*Attorney, Agent, or Firm*—Bernard J. Graves, Jr.; William P. Heath, Jr.

[57] ABSTRACT

Provided are polyester compositions having thermally stable colorants copolymerized therein, said colorants comprised of at least one electron-rich aromatic moiety attached to a negatively substituted 2,5-dioxypyrrolin-3-yl moiety and containing at least one, and preferably, two polyester reactive groups. Also provided are polyester color concentrates and blends of the colored polyester compositions with other thermoplastic polymers and shaped or formed articles comprised of same.

14 Claims, No Drawings

COLORED POLYESTER COMPOSITIONS

FIELD OF THE INVENTION

This invention belongs to the field of polyester chemistry. More particularly, it relates to polyester compositions having certain 2,5-dioxopyrrolin-3-yl compounds copolymerized therein.

BACKGROUND OF THE INVENTION

It is known that one may color polyester compositions using copolymerized anthraquinone colorants at low levels (see, for example, U.S. Pat. Nos. 4,276,306; 4,359,570; and 4,403,092). The anthraquinone colorants have the inherent disadvantages, however, of having low extinction coefficients and being expensive to manufacture, although they have excellent thermal stability and fastness to light.

Thermally stable yellow methine colorants derived, for example, from alkyl cyanoacetates and malononitrile active methylene components have also been used to produce polyester compositions containing copolymerized colorants therein and having excellent nonextractability of the colorants and good lightfastness (see U.S. Pat. No. 4,617,373). These yellow methine colorants have the advantage of having high extinction coefficients and thus provide excellent color yield. This reference also discloses red methine colorants which are derived from 3-cyano-4-phenyl-2-(5H)-furanone as the active methylene component (e.g. Example 761). These red compounds, however, are highly fluorescent and have inadequate lightfastness to produce satisfactory colored polyester packaging compositions where substantial exposure to sunlight is involved.

High tinctorial red colorants containing a tricyanovinyl group as part of the chromophoric system are also known and are reported to be useful for dyeing polyester fibers in lightfast red shades (U.S. Pat. No. 2,762,810). An example of this type of compound is as follows:

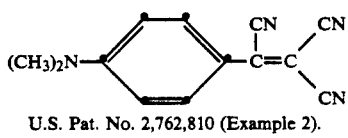

U.S. Pat. No. 2,762,810 (Example 2).

Although this type of structure generally provides bathochromic colors (red) versus the corresponding yellow dicyanovinyl compounds and have high extinction coefficients, they have poor thermal stability and are completely destroyed under high temperature polyester forming conditions.

It is also noted that bathochromic (red) methine compounds have been prepared from 7-substitutedaminocoumarin-3-aldehydes and active methylene compounds such as malononitrile (U.S. Pat. No. 4,018,796). An example is as follows:

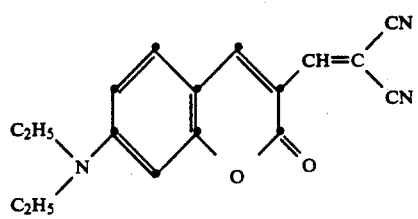

U.S. Pat. No. 4,018,796 (Example 1).

These compounds also have high extinction coefficients, but are highly fluorescent and exhibit poor thermal stability under polyester reaction conditions.

Also, U.S. Pat. No. 4,373,102 describes somewhat structurally related isoindoline compounds containing substituted ethylenic chromophoric groups which are reported to give red to blue shades when dyed on polyester fibers. A typical example is as follows:

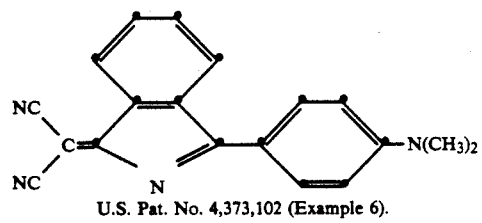

U.S. Pat. No. 4,373,102 (Example 6).

The isoindolines, however, generally have inadequate thermal stability when tested as colorants for copolymerization into polyesters.

Furthermore, structurally related to the compounds of this invention are 5-dicyanomethylene-2-oxo-3-pyrroline compounds described in U.S. Pat. No. 3,096,339 which give yellow to blue shades when dyed on polyester fibers. A typical dye is as follows:

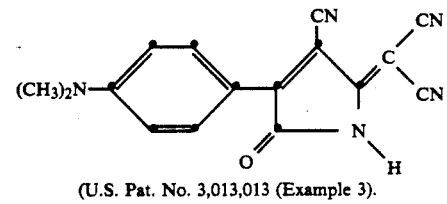

(U.S. Pat. No. 3,013,013 (Example 3).

These compounds have high extinction coefficients, but have shown poor thermal stability at the high temperatures required for polyester manufacture.

Finally, it is known that certain compounds which contain a negatively substituted 2,5-dioxopyrrolin-3-yl moiety are useful as bathochromic red dyes for dyeing synthetic fibers. A typical colorant is as follows:

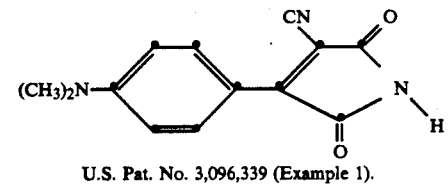

U.S. Pat. No. 3,096,339 (Example 1).

These compounds can be prepared by reacting an active hydrogen compound (A-H) with 2-chloro-3-negatively substituted maleimides:

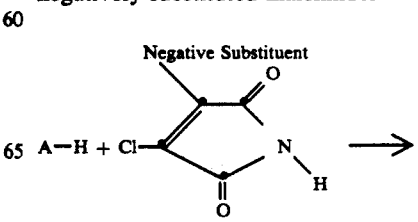

-continued

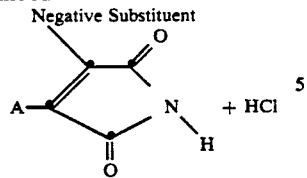

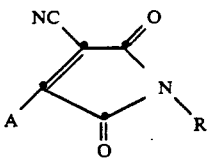 (I)

There is no teaching, however, in this patent that would lead one to believe that the compounds of this invention would have the required excellent thermal stability to allow them to be copolymerizable under polyester manufacturing conditions to produce colored polyesters.

SUMMARY OF THE INVENTION

This invention relates to polyester compositions having thermally stable colorants copolymerized therein, said colorants consisting of at least one electron rich aromatic moiety attached to a negatively substituted 2,5-dioxypyrrolin-3-yl moiety and containing at least one, preferably two, reactive groups capable of reacting with either the diol or dicarboxylic acid (or ester) used in preparing the polyester composition. These compositions have excellent nonextractability of colorant and good fastness to light and heat. The polyester compositions containing the copolymerized colorants are particularly suitable for use when nonextractibility of and nonexposure to potentially toxic colorants are important considerations. For example, the compositions which contain low levels of the copolymerized colorants are particularly suitable for packaging materials where excellent nonextractibility and color fastness properties are needed. Another embodiment of the invention includes amorphous and partially crystalline polyester color concentrates containing said colorants copolymerized therein at high levels, e.g., from about 1–30% by weight. Also provided by the invention are colored semicrystalline powders which may be obtained from the amorphous and partially crystalline color concentrates by a dissolution crystallization precipitation procedure. Finally, the present invention provides colored thermoplastic polymer compositions comprised of the colored polyester compositions admixed (e.g., melt or solution blended) with other thermoplastic polymers, and shaped or formed articles made therefrom.

DETAILED DESCRIPTION OF THE INVENTION

Certain 2,5-dioxypyrrolin-3-yl compounds have been found to have unexpected thermal stability and to be particularly suitable for copolymerizing to produce colored polyester compositions from yellow to violet in color and which have good lightfastness and high tinctorial power, thus overcoming the deficiencies of the compositions disclosed in the above mentioned prior art, which fails in particular, e.g., to disclose colored polyester compositions having thermally stable, high tinctorial colorants copolymerized therein and having good light fastness when exposed to sunlight.

The present invention provides a polyester composition having copolymerized therein or reacted therewith at least 0.001 weight percent of a residue of Formula (I):

wherein R is hydrogen, unsubstituted or substituted $C_1$–$C_{10}$ alkyl; unsubstituted or substituted $C_3$–$C_8$ cycloalkyl; $C_3$–$C_8$ alkenyl; $C_3$–$C_8$ alkynyl; phenyl and substituted phenyl;

A is represented by one of the following formulae:

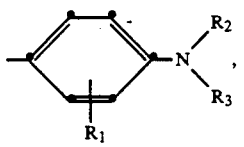

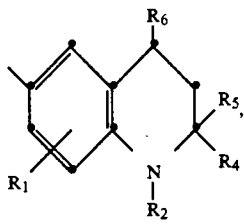

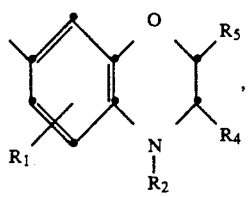

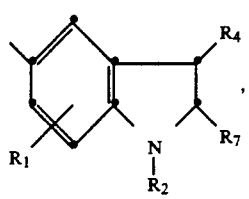

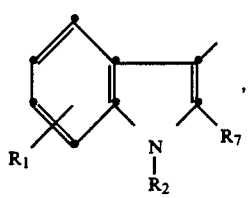

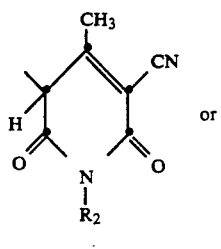

or

-continued

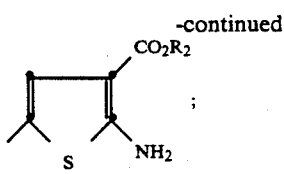

wherein $R_1$ is hydrogen or 1-2 groups selected from $C_1$-$C_4$ alkyl, $C_1$-$C_4$ alkoxy, O—$C_1$-$C_4$ alkylene—OH, O—$C_1$-$C_4$ alkylene-$C_1$-$C_4$ alkanoyloxy, $C_1$-$C_4$ alkylene—OH, $C_1$-$C_4$ alkylene-$C_1$-$C_4$ alkanoyloxy, halogen, $C_1$-$C_4$ alkanoylamino, amino, $C_3$-$C_8$ cycloalkylcarbonylamino, $C_1$-$C_4$ alkylsulfonylamino, arylsulfonylamino, arylaminocarbonylamino or arylcarbonylamino;

$R_2$ and $R_3$ are independently selected from unsubstituted or substituted $C_1$-$C_{10}$ alkyl; unsubstituted or substituted $C_3$-$C_8$ cycloalkyl; $C_3$-$C_8$ alkenyl; $C_3$-$C_8$ alkynyl; unsubstituted or substituted phenyl; or $R_2$ and $R_3$ may be combined with the nitrogen to which they are attached to form an A radical having the formula

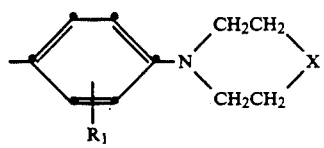

wherein
X is selected from a covalent bond, —$CH_2$—, —O—, —S—, —$SO_2$—, —C(O)—, —$CO_2$—, —NH—, —N(-CO$C_1$-$C_4$ alkyl)—, —N($SO_2C_1$-$C_4$ alkyl)—, —N(-CO—aryl)—, —N($SO_2$-aryl)—, or —N($R_2$)—;

$R_4$, $R_5$, and $R_6$ are hydrogen or $C_1$-$C_4$ alkyl; and $R_7$ is selected from hydrogen, $C_1$-$C_4$ alkyl or unsubstituted or substituted phenyl; with the provision that the compound of Formula (I) contains at least one polyester-reactive group.

Examples of such polyester reactive groups, i.e., a group reactive with at least one of the monomers from which the polyester is prepared, include hydroxy, carboxy, an ester radical, amino, alkylamino, and the like. The ester radicals may be any radical having one of the formulae

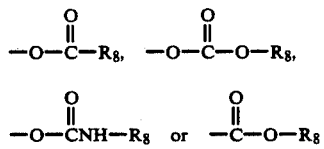

wherein $R_8$ is selected from unsubstituted or substituted alkyl, cycloalkyl or phenyl radicals. $R_8$ preferably is unsubstituted alkyl, e.g., alkyl of up to about 8 carbon atoms, or phenyl, and most preferably lower alkyl, e.g., methyl and ethyl. The reactive group preferably is hydroxy, carboxy, lower carbalkoxy, or lower alkanoyloxy of up to about 4 carbon atoms, e.g., carbomethoxy or acetoxy.

The unsubstituted and substituted $C_3$-$C_8$ cycloalkyl groups mentioned above refer to cycloaliphatic hydrocarbon groups which contain 3 to 8 carbons in the ring, preferably 5 or 6 carbons, and these cycloalkyl groups substituted with one or two of $C_1$-$C_4$ alkyl, $C_1$-$C_4$ alkoxy, hydroxy or $C_1$-$C_4$ alkanoyloxy.

The substituted phenyl groups mentioned above represent phenyl radicals which contain as substituents one or two of $C_1$-$C_4$ alkyl, $C_1$-$C_4$ alkoxy, $C_1$-$C_4$ alkoxy carbonyl, $C_1$-$C_4$ alkanoyloxy, $C_1$-$C_4$ alkanoylamino, halogen, carboxy, cyano, nitro, $C_1$-$C_4$ alkylsulfonyl, hydroxy, $C_1$-$C_4$ alkylene—OH, $C_1$-$C_4$ alkylene-$CO_2$H, $C_1$-$C_4$ alkylene—$CO_2R_8$, —O $C_1$-$C_4$ alkylene—OH, $C_1$-$C_4$ alkylene-$CO_2$H or —O $C_1$-$C_4$ alkylene—$CO_2R_8$.

The $C_3$-$C_8$ alkenyl and $C_3$-$C_8$ alkynyl groups represent straight or branched chain hydrocarbon radicals containing 3 to 8 carbons in the chain and which contain a carbon carbon double bond or a carbon-carbon triple bond, respectively.

The unsubstituted and substituted $C_1$-$C_{10}$ alkyl groups mentioned above refer to fully saturated hydrocarbon radicals containing one to ten carbons, either straight or branched chain, and such alkyl radicals substituted with one or more of the following: —methoxycarbonyl, a group of the formula —$C_2H_4O_2CCH_3$, $C_3$-$C_8$ cycloalkyl or $C_3$-$C_8$ cycloalkyl substituted with one or two of $C_1$-$C_4$ alkyl, $C_1$-$C_4$ alkylene-OH, lower alkoxy or halogen; phenyl and phenyl substituted with one or two of lower alkyl, lower alkoxy, halogen, lower alkanoylamino, cyano, nitro or lower alkylsulfonyl; cyano; halogen; 2-pyrrolidino; phthalimidino; vinyl sulfonyl; acrylamido; o-benzoic sulfimido; lower alkoxyalkoxy; cyanoalkoxy; phenoxy; phenoxy substituted with lower alkyl, lower alkoxy, or halogen; groups of the formulae:

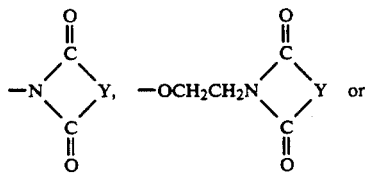

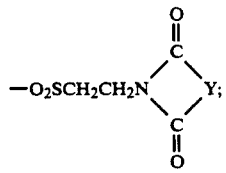

wherein Y is selected from o-phenylene; o-phenylene substituted with lower alkyl, lower alkoxy, halogen or nitro; $C_2$-$C_3$ alkylene; vinylene; —O—$CH_2$—; —$OCH_2CH_2$—; —$CH_2OCH_2$; —S—$CH_2$—; —$CH_2SCH_2$—; —$NHCH_2$—; —$NHCH_2CH_2$—; —N(alkyl)$CH_2$—; —N(alkyl)$CH_2CH_2$ or NHC($C_6H_5$)$_2$; groups of the formulae:

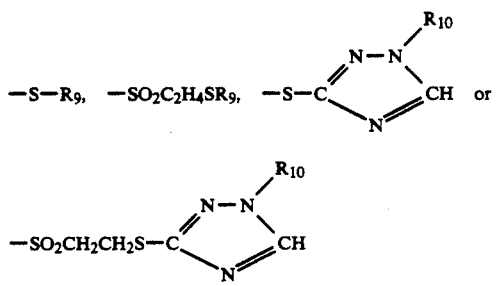

wherein $R_9$ is selected from lower alkyl; $C_3$-$C_8$ cycloalkyl; phenyl; phenyl substituted with one or more groups selected from lower alkyl, hydroxy lower alkyl, lower alkoxy or halogen; a heterocyclic radical selected from pyridyl; pyrimidinyl; benzoxazolyl; benzothiazolyl; benzimidazolyl; 1,3,4-thiadiazolyl, 1,3,4-oxadiazolyl; said heterocyclic radicals further substituted with one or more groups selected from lower alkyl, lower alkoxy carbonyl, carboxy, lower alkoxy or halogen;

$R_{10}$ is selected from hydrogen, lower alkyl, hydroxy lower alkyl or benzyl; groups of the formulae:

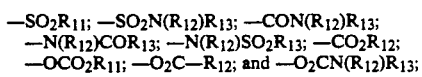

wherein $R_{11}$ is selected from $C_3$-$C_8$ cycloalkyl; $C_3$-$C_8$ cycloalkyl substituted with $C_1$-$C_4$ alkyl; allyl; phenyl; phenyl substituted with one or two groups selected from lower alkyl, lower alkoxy or halogen; lower alkyl; lower alkyl substituted with one or more groups selected from lower alkoxy, halogen, hydroxy, lower carbalkoxy, lower alkanoyloxy, cyano, $C_3$-$C_8$ cycloalkyl, phenyl, phenoxy, lower alkylthio or lower alkylsulfonyl; and $R_{12}$ and $R_{13}$ are each independently selected from hydrogen or those groups represented by $R_{11}$.

In the above definitions each alkyl, cycloalkyl, phenyl, or hetroaryl group may be substituted with a polyester reactive group mentioned above such that one or preferably two reactive groups are present in the colorants of Formula (I).

In the terms lower alkyl, lower alkoxy, lower alkoxycarbonyl, lower alkanoylamino and lower alkanoyloxy, the alkyl portion of the group contains one to four carbons and may denote a straight or branched chain.

The term lower alkylene denotes a straight or branched chain divalent hydrocarbon moiety containing one to four carbon atoms.

The particularly preferred colorants useful in the practice of the invention are those of Formula (I):

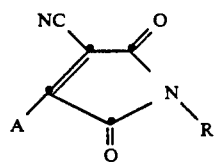

wherein A is selected from one of the following general formulae;

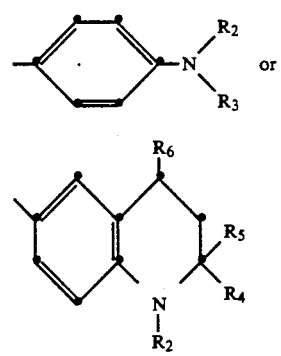

wherein R, $R_2$, $R_3$, $R_4$, $R_5$ and $R_6$ are as defined above and with the proviso that at least one and preferably two polyester reactive groups be present in the molecule. It is further preferred that one reactive group be present on R and another present on $R_2$.

Colorants of Formula (I), (R=H) may be prepared by reacting active hydrogen compounds (II) with 2-chloro-3-cyanomaleimide (III):

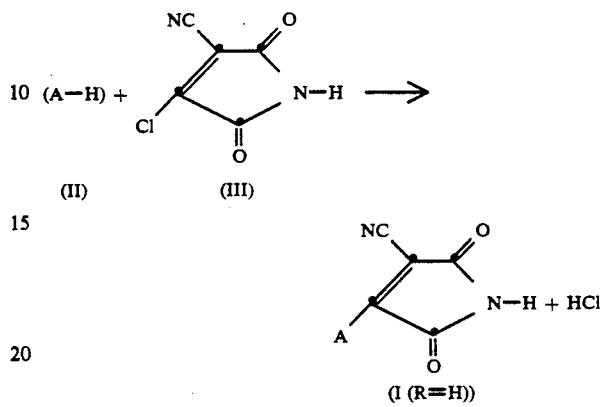

at temperatures of 25°-100° in inert solvents such as esters, halogenated hydrocarbons, ketones or carboxamides, e.g. N,N-dimethylformamide. Compounds of Formula (I) (R=H) may be reacted further with compounds having active halogens, e.g., alkylating agents, to produce a variety of compounds (I) where R may or may not contain polyester reactive groups. The preparation of 2-chloro-3-cyanomaleimide (III) and the reaction of (III) with substituted anilines are known. Furthermore, it is known that one may react substituted 2,3-dichloromaleimides with substituted anilines in the presence of metal cyanides, e.g. sodium cyanide.

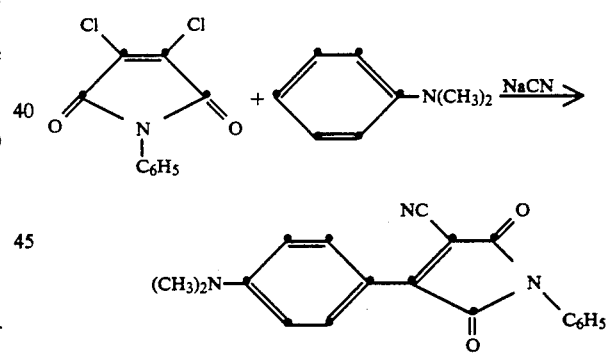

The intermediate compounds A-H are either known compounds or may be synthesized by known synthetic methods.

As a further aspect of the present invention, there is provided an amorphous color concentrate comprising an amorphous polyester having copolymerized therein or reacted therewith at least about 5.0 weight percent of a residue of Formula (I).

As a further aspect of the present invention, there is provided a partially crystalline polyester color concentrate comprised of a partially crystalline polyester having copolymerized therein or reacted therewith at least about 5.0 weight percent of a residue of Formula (I).

As a further aspect of the present invention, there is provided a colored semicrystalline powder having an average particle diameter of less than about 50 microns comprising a normally amorphous polyester or a partially crystalline polyester which has been modified by dissolution-crystallization precipitation to impart increased crystallinity thereto having copolymerized therein or reacted therewith at least about 5.0 weight percent of a residue of Formula (I).

The colored polyester compositions provided by this invention comprise extrusion, molding and fiber grade, thermoplastic, linear polyester having reacted therewith or copolymerized therein a compound of Formula (I). It is apparent that the amount of residue present in the polyester material will vary substantially depending on several factors such as the particular compound being used, for example, the tint or depth of shade desired, and the thickness of the article, e.g., film, bottle, etc., to be produced from the colored polyester composition. For example, relatively thin film and thin-walled containers require higher levels of the compounds of Formula (I) to produce an equivalent color than do thicker articles such as sheet material or tubing.

The polyesters which may be used in the preparation of the compositions of our invention include linear, thermoplastic, crystalline or amorphous polyesters produced by conventional polymerization techniques from one or more diols and one or more dicarboxylic acids. The polyesters normally have an inherent viscosity (IV) of about 0.2 to about 1.2. The preferred polyesters comprise at least about 50 mole percent terephthalic and/or 2,6-naphthalenedicarboxylic acid residues and at least about 50 mole percent ethylene glycol and/or 1,4-cyclohexanedimethanol residues. Particularly preferred polyesters are those containing from about 75 to 100 mole percent terephthalio and/or 2,6-naphthalenedicarboxylic acid residues and from about 75 to 100 mole percent ethylene glycol residues.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 2-methyl-1,3-propanediol, 1,6-hexanediol, tetramethyl-1,3-cyclobutanediol, 1,2-cyclohexanediol, 1,4-cyclohexanediol, 1,2-cyclohexanedimethanol, 1,3-cyclohexanedimethanol, X,8-bis(hydroxymethyl) tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The novel colored polyester compositions provided by this invention are useful in the manufacture of containers or packages for comestibles such as beverages and foods. By the use of known heat setting techniques, certain of the polyesters are, in terms of color, I.V. and heat distortion, stable at temperatures up to about 100° C. Such stability characteristics are referred to as "hot-fill" stability. Articles molded from these polyesters exhibit good thin wall rigidity, excellent clarity and good barrier properties with respect to moisture and atmospheric gases, particularly carbon dioxide and oxygen. The colored polyesters are particularly useful for the fabrication of containers having a wall thickness of about 10 to 30 mils. Further, the color concentrates of the present invention may be melt blended with other colored or uncolored polyesters or blended with other polymers used in packaging materials. Thus, as a further aspect of the present invention, there is provided a formed article comprising the polyester composition as described above.

The linear polyesters most preferred for use in one embodiment of the invention comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate) and wherein the polyesters have been sufficiently heat set and oriented by methods well known in the art to give a desired degree of crystallinity. For the manufacture of blow molded beverage bottles, the most preferred polyesters have an I.V. of 0.65 to 0.85, and a glass transition temperature (Tg) greater than 70° C. The glass transition temperature (Tg) referred to herein is determined by Differential Scanning Calorimetry at a scan rate of 20 Centigrade Degrees/minutes. The inherent viscosities (I.V., dl/g) of the polyesters described herein are determined at 25° C. using 0.5 g polymer per 100 mL of a solvent consisting of 60 parts by weight phenol and 40 parts by weight tetrachloroethane.

Colorants of Formula (I) are generally added at levels of about 1–5,000 ppm (parts by weight) before or during the polymerization reaction. For example, the colorants may be added along with the initial glycol and diacid (or ester) reactants, immediately prior to the polycondensation stage or subsequently. For this end use, the colorant compound of Formula (I) may contain one or a multiplicity of reactive groups, since addition of the copolymerizable colorants in relatively low levels does not interfere substantially with the polymer preparation even if chain termination or crosslinking do occur.

The compounds of Formula (I) and the reacted residues thereof possess the critical property of being sufficiently thermally stable to permit their copolymerization with polyesters by adding them at the start or at an early stage of the polyester preparation. Neither the colorant compounds nor their reacted residues sublime under polymerization conditions and the residues are not extractable from the polyesters. The thermal stability of the compounds of Formula (I) is particularly important in the preparation of the color concentrates, i.e., polyesters containing from 1.0, especially at least 5.0, to as high as 50 weight percent of colorant residue. The color concentrates are advantageous in that the colorant moiety (1) is stable to heat and chemicals, (2) is resistant to sublimation, heat migration, bleeding and leaching by solvents, (3) possesses high color value or chroma and visible light absorption characteristics which allows the color concentrates to be combined with other color concentrates to provide a range of colors, (4) is safe to humans and the environment, and (5) may be blended with other polymers.

The colored semicrystalline powders provided by this invention may be derived from the color concentrates by means of a dissolution crystallization-precipitation technique described in detail below. Various processes for the manufacture of finely divided forms of polyesters have been disclosed in the prior art such as U.S. Pat. Nos. 4,378,228, 4,254,207, 3,586,654, 3,931,082, 4,267,310, 4,305,864, 4,451,606, 3,674,736 and 3,669,922. Some of these known processes include the presence of pigments such as carbon black during particle size reduction to produce colored polyester powders. The known procedures are summarized below.

1. Comminution, as by grinding, which is difficult and expensive and results in highly irregular shaped particle having a broad range of particle size distribution.

2. Spray drying techniques which tend to produce "hollow shells" or porous particles and also are hazardous when organic solvents are used to dissolve the polyester.

3. Dispersion processes which involve melting the polymer in an inert solvent in the presence of a non-ionic dispersing agent. Polyester, in contrast to other thermoplastic polymers, tend to hydrolyze (decompose) when melted in the presence of water and the particles thus produced have a strong tendency to agglomerate or coalesce.

4. Heating under shearing agitation conditions a condensation polymer in an aprotic liquid which is not a solvent for the polymer and in the presence of a dispersing agent to form small liquid particles and cooling with agitation. Colorants added during this process are still extractable, sublimable, and may exude from the polymer.

5. Solvent induced crystallization wherein an amorphous polymer is initially contacted with a crystal-inducing fluid under certain conditions while the polymer is subjected to physical and/or ultrasonic forces. Colorants added during this process are not reacted with the polymer and therefore are subject to removal from the polymer.

6. Producing microcrystalline polyesters by a hydrolytic removal of amorphous regions of synthetic, linear polyesters followed by a mechanical disintegration of the resulting aggregated microcrystals.

7. Crystallization of polyesters in the presence of nucleating agents.

The prior art does not disclose the preparation of colored microcrystalline polyester powders wherein an amorphous or partially crystalline polyester, having a thermally-stable, colorant compound of Formula (I) copolymerized therein, is converted to a colored, microcrystalline, polyester powder by means of a dissolution-crystallization precipitation procedure. The prior art also fails to disclose microcrystalline, polyester powders containing high levels of colorant of Formula (I) incorporated therein which cannot be removed by extraction or sublimation and which does not exude from the surface of the polymer.

The amorphous color concentrates of this invention exhibit a glass transition temperature (Tg) and no, or only a trace of, crystallization or melting point by differential scanning calorimetry (DSC). Examples of such amorphous polyesters include those obtained by the polymerization of a colorant compound of Formula (I), terephthalic and/or 2,6-naphthalenedicarboxylic acid and a branched-chain diol having the formula

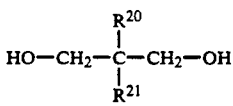

wherein $R^{20}$ is hydrogen or an unsubstituted or substituted alkyl, cycloalkyl or aryl radical, and $R^{21}$ is an unsubstituted or substituted alkyl, cycloalkyl or aryl radical. Preferred amorphous polyester color concentrates have an inherent viscosity of about 0.2 to 0.8 and are comprised of:

(i) diacid residues comprised of at least 50, preferably at least 80, mole percent terephthalic and/or 2,6 naphthalenedicarboxylic acid residues;

(ii) diol residues comprised of at least 50, preferably at least 80, mole percent of residues of a diol having the formula

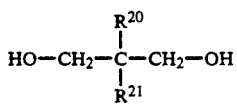

wherein $R^{20}$ is hydrogen or lower alkyl and $F^{21}$ is lower alkyl; and (iii) residues of a colorant compound of Formula (I).

The particularly preferred amorphous polyester color concentrates are comprised of (i) diacid residues consisting essentially of terephthalic and/or 2,6-naphthalenedicarboxylic acid residues; (ii) diol residues consisting essentially of 2,2-dimethyl 1,3-propanediol residues; and (iii) residues of a colorant compound of Formula (I).

Other amorphous polyesters, as defined above, suitable for preparing the colored semicrystalline powders may be obtained by employing (1) two dicarboxylic acids and one or more diols or (2) two diols and one or more dicarboxylic acids according to known procedures for obtaining amorphous polyesters. The polyester comprising a diacid component consisting of 75 mole percent terephthalic acid residues and 25 mole percent 1,4-cyclohexanedicarboxylic acid residues, a diol component consisting of 1,4-butanediol residues and residues of a compound of Formula (I) is an example of such a polyester.

The partially crystalline color concentrates of this invention usually exhibit a glass transition temperature, a crystallization temperature and a melting temperature by DSC. These partially crystalline, poly ester concentrates are comprised of (i) diacid residues consisting of at least 80 mole percent terephthalic acid residues, 2,6-naphthalenedicarboxylic acid residues, 1,3-cyclohexanedicarboxylic acid residues, 1,4-cyclo-hexanedicarboxylic acid residues or a mixture thereof, (ii) diol residues consisting of at least 50 mole percent of residues having the formula $-O-(CH_2)_p-O-$ wherein p is 2, preferably 4, to 12 and (iii) residues of colorant compound. A preferred partially crystalline color concentrate has a melting temperature of at least 110° C. and is comprised of (i) diacid residues comprised of at least 80 mole percent terephthalic acid residues, (ii) diol residues comprised of at least 80 mole percent of residues of 1,4-butanediol and (iii) residues of a colorant compound of Formula (I). An especially preferred partially crystalline color concentrate has a melting temperature of at least 110° C. and consists essentially of (i) terephthalic acid residues, (ii) 1,4-butanediol residues and (iii) a colorant compound of Formula (I).

The colored semicrystalline powders provided by this invention may be obtained by means of a dissolution-crystallization-precipitation procedure wherein the amorphous or partially crystalline polyester color concentrates described above are dissolved in an organic solvent from which the polymeric color concentrate is recovered in a finely divided form consisting of particles of relatively uniform size, e.g., from about 10 to 50 microns. If desired, the particle size of the colored semicrystalline powders may be reduced further by conventional grinding processes. Examples of solvents in which the amorphous and/or partially-crystalline concentrates may be dissolved include halogenated hydrocarbons such as aliphatic chlorides, e.g., methylene chloride; esters such as alkyl esters of carboxylic acids, e.g., ethyl acetate and methyl benzoate; hydrocarbons such as toluene; and ethers such as tetrahydrofuran. We have found methylene chloride to be a particularly effective solvent.

The particular dissolution crystallization-precipitation procedure utilized is not critical. The amorphous or partially-crystalline concentrate may be dissolved in a suitable solvent at elevated temperatures and then crystallized in a finely divided state by cooling, with or without a reduction in the volume of solvent, i.e., either with or without a solution concentration step. Another useful technique involves dissolving the amorphous concentrate in an organic solvent, either at ambient or elevated temperature, and then adding to the solution another miscible solvent which causes crystallization of the colored semi-crystalline powder. The use of methylene chloride as the primary solvent and an alkyl acetate such as ethyl acetate as the "crystallization inducing" solvent has been found to be particularly efficacious. Depending on their intended utility, the colored semicrystalline powders may be extracted with a suitable organic solvent to remove relatively low molecular weight polyester oligomers. Examples of oligomer extracting solvents include ketones such as acetone, 2-pentanone, 3-methyl-2-butanone, 4-methyl-2-pentanone, 2-hexanone and 5-methyl-2-hexanone; hydrocarbons such as hexane, heptane and toluene; and ethers such as tetrahydrofuran. Another, but not preferred, dissolution precipitation procedure involves dissolving the amorphous color concentrates in certain solvents, e.g., ethyl acetate, from which the polymeric color concentrate, after under-going a change in morphology, precipitates.

Some of the more crystalline polyesters such as poly(ethylene terephthalate) and poly(tetramethylene terephthalate) require the use of a high boiling solvent in the dissolution precipitation procedure. Examples of such high boiling solvents include alkyl esters of aromatic carboxylic acids, e.g., alkyl benzoates, and alkyl phthalates; aliphatic dicarboxylic acid esters; glycol esters, e.g., ethylene glycol diacetate; diethylene glycol diacetate; aromatic ketones, e.g., acetophenone, and aromatic oxides, e.g., diphenyl oxide; and aliphatic carboxamides, e.g., N,N-dimethylformamide and isophorone. Methyl benzoate and ethylene glycol diacetate are particularly preferred high-boiling solvents since they are readily available, have a pleasant odor and do not cause color problems during crystallization which sometimes is a problem with acetophenone.

In one variation of the process, crude polyester color concentrate is prepared and granulated to a very course powder which is heated with a high boiling solvent (methyl benzoate) to facilitate solution. Upon cooling, crystallization precipitation occurs and a diluent such as acetone usually is needed to permit stirring. Filtration gives the finely divided powder which may require washing or reslurrying to remove the crystallization solvent.

In another variation of the dissolution-crystallization-precipitation process, crystallization can occur as an integral part of the polyester color concentrate manufacturing process wherein the crystallization solvent is added to a melt of the concentrate to obtain a solution of the color concentrate which then may be obtained as a powder by precipitation. The polyester color concentrate powder is thus obtained in a purified form without the need of granulating by a means which may be used in conjunction with batch processing.

The dissolution crystallization precipitation procedure alters the morphology of the amorphous and partially-crystalline polyester color concentrates in a number of respects. X Ray diffraction analysis of the colored semicrystalline powders shows a marked increase in the crystallinity of the polyester and, while the amorphous polyester concentrates do not exhibit a melting temperature, the microcrystalline concentrates usually (almost always) exhibit a melting temperature by DSC. Although the weight average molecular weight (Mw) may increase, decrease or not be changed by the dissolution-crystallization precipitation procedure, the number average molecular weight (Mn) always increases, the magnitude of the increase depending on the degree to which oligomeric material has been removed from the colored semicrystalline polyester powder. The polydispersity ratio (Mw:Mn) of the colored semicrystalline polyester is always less than that of the polyester concentrate from which it is prepared due to the increase in Mn (even when Mw increases, Mn increases more). Finally, the inherent viscosity of the colored semicrystalline powders normally is slightly higher than that of the color concentrate.

The amorphous and partially crystalline polyester color concentrates may be used in coloring various thermoplastic polymeric materials when non-extractability or non-volatility of the colorant is critical because of toxicity considerations, e.g., in rigid and flexible packaging materials for food. The concentrates and powders may be used in formulating inks, coatings, toners for impactless printing, and similar products.

The polyester color concentrates may be prepared according to conventional esterification or trans esterification and melt polycondensation procedures using (i) a dicarboxylic acid or, preferably, a lower alkyl ester thereof, (ii) a diol and (iii) a compound of Formula (I) bearing one to four, preferably about two, polyester reactive groups. Normally, at a 50 mole percent excess of the diol is used. The colorant compound of Formula (I) preferably is added with the other monomers at the commencement of the color concentrate manufacture although it may be added subsequently, e.g., at the beginning or during the polycondensation step. The concentration (weight percent) of the colorant residue is determined by summing up the weights of all the components charged to the reactor and subtracting the sum of the weights of the components removed during transesterification and polycondensation, e.g., methanol and excess diol. The difference represents the theoretical yield of the color concentrate. The weight of the colorant of Formula (I) charged to the reactor is divided by the theoretical weight and multiplied by 100 to give the weight percent of colorant residue.

As a further aspect of the present invention, there is provided a colored thermoplastic polymer composition, which comprises one or more thermoplastic polymers and one or more colored polyester compositions.

The thermoplastic resin systems useful for blending with the colored polyester compositions of the present invention include polyesters such as poly (ethylene terephthalate); polyamides such as nylon 6 and nylon 66; polyimides, polyolefins, e.g., polyethylene, polypropylene, polybutylene and copolymers made from ethylene, propylene or butylene. Other thermoplastic polymers include cellulosic resins such as cellulose acetate, cellulose propionate, or cellulose butyrate; polyacrylate resins such as polymethyl methacrylate; polycarbonates; polyurethanes; polystyrene; polyacrylonitrile; polyvinylidene chloride; polyvinyl chloride; etc.

The novel color concentrates and their preparation are further illustrated by the experimental section below. The inherent viscosities specified herein are determined at 25° C. using 0.5 g of polymer (polyester color concentrate) per 100 mL of a solvent consisting of 60 weight percent phenol and 40 weight percent tetrachloroethane. The weight average molecular weight (Mw) and number average molecular weight value referred to herein are determined by gel permeation chromatography. The melting temperatures are determined by differential scanning calorimetry on the first and/or second heating cycle at a scanning rate of 20° C. per minute and are reported as the peaks of the transitions.

The color concentrates provided by this invention comprise a polyester composition having copolymerized therein at least 0.5 wt %, based on the weight of the polyester, or more of the residue of one or more of colorants of Formula (I) wherein the initial colorant contains about two polyester reactive groups. Normally, the color concentrates will not contain greater than about 30 wt % of colorant residue, with a concentration in the range of about 5 to 20 wt % being preferred.

EXPERIMENTAL SECTION

Example 1

Preparation of 4-[4-Bis(2-hydroxyethyl)-amino]phenyl]-2,5-dihydro-2,5-dioxo-1H-pyrrole-3-carbonitrile A reaction mixture of N,N-bis(2-hydroxyethyl)-aniline (0.90 g, 0.005 m), 2-chloro-3-cyanomaleimide (0.80 g, 0.0051 m) and methanol (20 mL) was heated at reflux for 1.5 hour. The red product crystallized upon cooling and was collected by filtration, washed with methanol and dried in air. The yield was 0.5 g (29.6% of the theoretical yield) of product which has the following structure as supported by mass spectrometry:

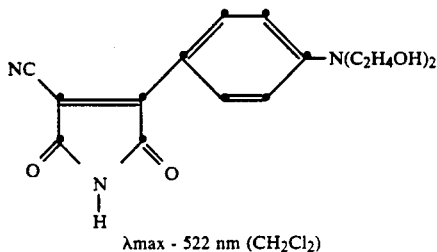

λmax - 522 nm (CH₂Cl₂)

A maximum absorption (λmax) at 522 nm is observed in the visible absorption spectrum.

Example 2

The following compounds were placed in a 500 mL, single-necked, round bottom flask:
- 97 g (0.5 mol) dimethyl terephthlate
- 62 g (1.0 mol) ethylene glycol
- 0.29 mL of a n butanol solution of acetyltriisopropyl titanate which contains 0.0087 g Ti
- 0.0192 g colorant of Example I (200 ppm)

The flask was equipped with a nitrogen inlet, stirrer, vacuum outlet, and condensing flask. The flask and contents were heated at 200° C. in a Belmont metal bath for 60 min, at 210° C. for 75 min, and at 230° C. for 50 min with a nitrogen sweep over the reaction mixture. The temperature of the bath was increased to 270° C. With a stream of nitrogen bleeding in the system, vacuum was applied slowly at 270° C. over a 10 min period until the pressure was reduced to 100 mm Hg. The flask and contents were heated at 270° C. under a pressure of 100 mm Hg for 30 min. The metal bath temperature was increased to 285° C. and the pressure reduced to 4.5 mm Hg over a 10 min period. The flask and contents were heated at 285° C. under a pressure of 4.5 mm Hg for 25 min. Then the pressure was reduced to 0.3 mm Hg and polycondensation continued at 285° C. for 16 min. The flask was removed from the metal bath and is allowed to cool while the polymer crystallizes. The resulting polymer had an inherent viscosity of 0.69 measured in a 60/40 ratio by weight of phenol/tetrachloroethane at a concentration of 0.5 g per 100 mL. An amorphous 14 mil film molded from this polymer absorbs visible light strongly in the 500–530 nm range, which indicates good thermal stability of the colorant.

Example 3

Preparation of 4-[4[2-(acetyloxy)ethyl]-ethylamino]phenyl]4-cyano-2,5-dihydro-2,5-dioxy-1H-pyrrol-3-carbonitrile A mixture of N-(2-acetyloxy ethyl)-N-ethyl-aniline (2.07 g, 0.01 m), 2-chloro-3-cyanomaleimide (1.56 g, 0.01 m) and ethyl acetate (30 mL) was heated and stirred at about 90° C. for one hour. The solvent was removed under vacuum. The residual solid was recrystallized from methanol, collected by filtration, washed with methanol and dried in air. The yield was 1.2 g (36.7% of the theoretical yield) of crystalline product which has the following structure as evidenced by mass spectrometry:

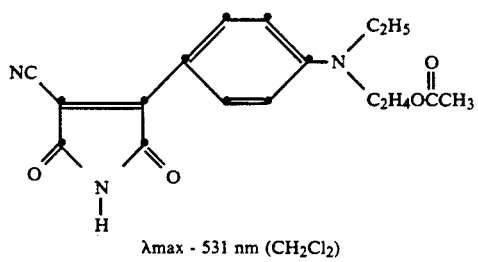

λmax - 531 nm (CH₂Cl₂)

An absorption maximum at 531 nm ($\epsilon_{max}$—31,850) is observed in the visible absorption spectrum in methylene chloride.

Example 4

The following materials were placed in a 500 mL three-necked, round bottom flask:
- 97 g (0.5 mol) dimethyl terephthalate
- 62 g (1.0 mol) ethylene glycol
- 0.00192 g Ti from a n butanol solution of acetyl-triisopropyl titanate
- 0.0053 g Mn from an ethylene glycol solution of manganese acetate
- 0.0345 g antimony trioxide
- 0.0072 g Co from an ethylene glycol solution of cobaltous acetate
- 0.0192 g colorant of Example 3

The flask was equipped with a nitrogen inlet, stirrer, vacuum outlet, and condensing flask. The flask and contents were heated at 200° C. in a Belmont metal bath for 60 minutes and at 210° C. for 75 minutes with a nitrogen sweep over the reaction mixture. Then, 1.57 mL of an ethylene glycol slurry of a mixed phosphorous ester composition (Zonyl A) which contained 0.012 g phosphorous was added. The temperature of the bath was increased to 230° C. and a vacuum with a slow stream of nitrogen bleeding in the system was applied over a five minute period until the pressure had been reduced to about 200 mm Hg. The flask and contents were heated at about 230° C. under a pressure of about 200 mm Hg for 25 minutes. The metal bath temperature was then increased to about 270° C. At 270° C, the pressure slowly reduced to about 100 mm Hg and the flask and contents heated at about 270° C. for 30 minutes. The metal bath temperature was increased to 285° C. and the pressure reduced slowly to 4.5 mm Hg. The flask and contents were heated at 285° C. under pressure of 4.5 mm Hg for 25 minutes. Then the pressure was reduced to 0.25 mm Hg and polycondensation continued for 40 minutes. The flask was removed from the metal bath and was allowed to cool in a nitrogen atmosphere while the polymer crystallized. The resulting polymer has an inherent viscosity of 0.56 as measured in a 60/40 ratio by weight of phenol/tetrachloroethane at a concentration of 0.5 g per 100 mL. A 14 mil film molded from this polymer is bright pink which indicates good thermal stability of the colorant.

Example 5

Preparation of Methyl 4-[[3-[4[[2-(acetyloxy)ethyl]ethyl]aminophenyl]-4-cyano-2,5-dihydro-2,5-dihydroxy-1H-pyrrol-1-yl]methyl]benzoate The colorant from Example 3 (1.0 g, 0.003 m), methyl 4-(chloromethyl)benzoate(1.5 g, 0.008 m), ethanol (50 mL) and sodium carbonate (1.0 g) were mixed and heated with stirring for 8 hours. The reaction mixture was cooled and drowned into water to yield a solid red colorant which was collected by filtration, washed with water and dried in air. A yield of 1.0 g (70.6% of the theoretical yield) was obtained of product which has the following structure as shown by mass spectrometry:

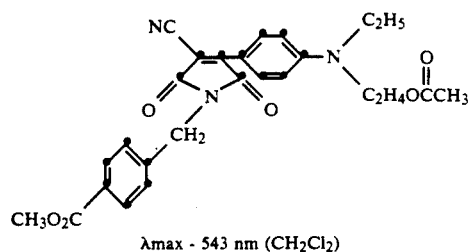

$\lambda max$ - 543 nm ($CH_2Cl_2$)

An absorption maximum ($\lambda max$) is observed at 543 nm ($\epsilon_{max}$—30,036) in the visible absorption spectrum in methylene chloride.

Example 6

The following materials were placed in a 500 mL three-necked, round bottom flask:
- 97 g (0.5 mol) dimethyl terephthalate
- 62 g (1.0 mol) ethylene glycol
- 0.00192 g Ti from a n butanol solution of acetyl triisopropyl titanate
- 0.0053 g Mn from an ethylene glycol solution of manganese acetate
- 0.0345 g antimony trioxide
- 0.0072 g Co from an ethylene glycol solution of cobaltous acetate
- 0.0192 g colorant of Example 5

The flask was equipped with a nitrogen inlet, stirrer, vacuum outlet, and condensing flask. The flask and contents were heated at 200° C. in a Belmont metal bath for 60 minutes and at 210° C. for 75 minutes with a nitrogen sweep over the reaction mixture. Then, 1.57 mL of an ethylene glycol slurry of a mixed phosphorous ester composition (Zonyl A) which contained 0.012 g phosphorous was added. The temperature of the bath was increased to 230° C. and a vacuum with a slow stream of nitrogen bleeding in the system was applied over a five minute period until the pressure has been reduced to about 200 mm Hg. The flask and contents were heated at about 230° C. under a pressure of about 200 mm Hg for 25 minutes. The metal bath temperature was then increased to about 270° C. At 270° C., the pressure was slowly reduced to about 100 mm Hg and the flask and contents heated at about 270° C. for 30 minutes. The metal bath temperature was increased to 285° C. and the pressure reduced slowly to 4.5 mm Hg. The flask and contents were heated at 285° C. under pressure of 4.5 mm Hg for 25 minutes. Then the pressure was reduced to 0.25 mm Hg and polycondensation continued for 40 minutes. The flask was removed from the metal bath and allowed to cool in a nitrogen atmosphere while the polymer crystallized. The resulting polymer has an inherent viscosity of 0.54 as measured in a 60/40 ratio by weight of phenol/tetrachloroethane at a concentration of 0.5 g per 100 mL. An amorphous 14 mil film molded from this polymer absorbs visible light strongly with a maximum absorbance at about 539 nm, which indicates good thermal stability.

Example 7

A mixture of 2-chloro-3-cyanomaleimide (0.78 g, 0.005 m), 3-cyano-6-hydroxy-4-methyl-N-(2,2-dimethyl-3-hydroxypropyl)-2-pyridone (1.19 g, 0.005 m), methylene chloride (5 mL) and ethyl acetate (5 mL) was stirred and heated on a steam bath for 5-10 minutes. The orange mixture was allowed to cool and the solvent removed by evaporation. After being crystallized from isopropyl alcohol, filtered, washed with isopropyl alcohol, and air dried a crystalline orange solid (0.75 g) was obtained. Absorption maxima at 339 nm ($\epsilon_{max}$—15,592) and 454 nm ($\epsilon_{max}$—4,320) are observed in the UV-visible spectrum in methylene chloride. Mass spectrum analysis supports the following structure:

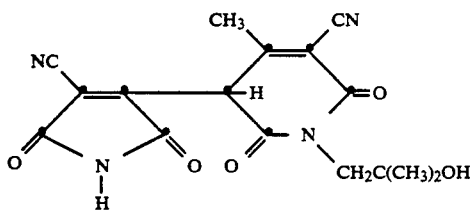

Example 8

The following materials were placed in a 500 mL three-necked, round bottom flask:

97 g (0.5 mol) dimethyl terephthalate
62 g (1.0 mol) ethylene glycol
0.00192 g Ti from a n butanol solution of acetyl triisopropyl titanate
0.0053 g Mn from an ethylene glycol solution of manganese acetate
0.0345 g antimony trioxide
0.0072 g Co from an ethylene glycol solution of cobaltous acetate
0.0384 g colorant (400 ppm) of Example 7

The flask was equipped with a nitrogen inlet, stirrer, vacuum outlet, and condensing flask. The flask and contents were heated at 200° C. in a Belmont metal bath for 60 minutes and at 210° C. for 75 minutes with a nitrogen sweep over the reaction mixture. Then, 1.57 mL of an ethylene glycol slurry of a mixed phosphorous ester composition (Zonyl A) which contained 0.012 g phosphorous was added. The temperature of the bath was increased to 230° C. and a vacuum with a slow stream of nitrogen bleeding in the system was applied over a five minute period until the pressure had been reduced to about 200 mm Hg. The flask and contents were heated at about 230° C. under a pressure of about 200 mm Hg for 25 minutes. The metal bath temperature was then increased to about 270° C. At 270° C., the pressure was slowly reduced to about 100 mm Hg and the flask and contents heated at about 270° C. for 30 minutes. The metal bath temperature was increased to 285° C. and the pressure reduced slowly to 4.5 mm Hg. The flask and contents were heated at 285° C. under pressure of 4.5 mm Hg for 25 minutes. Then the pressure was reduced to 0.25 mm Hg and polycondensation continued for 40 minutes. The flask was removed from the metal bath and allowed to cool in a nitrogen atmosphere while the polymer crystallized. The resulting polymer has an inherent viscosity of 0.52 as measured in a 60/40 ratio by weight of phenol/tetrachloroethane at a concentration of 0.5 g per 100 mL. A film, 15 mil thick, prepared from the polymer has an absorption maximum ($\lambda$max) at about 440 nm and is bright yellow in color which indicates that the colorant has good thermal stability and low volatility.

Example 9

Methyl 4-[(N-ethyl-3-methylphenyl amino) methyl]-benzoate (25.0 g, 0.088 m) was dissolved in ethyl acetate (100 mL) and the solution added to a stirred solution of 2 chloro 3 cyanomaleimide (18.0 g, 0.115 m) dissolved in ethyl acetate (150 mL) at room temperature and the reaction mixture stirred for 2.0 hours. Thin-layer chromatography indicated some of the m-toluidine reactant still present. An additional quantity (10.0 g) of the 2-chloro-3-cyanomaleimide was added and the reaction mixture stirred for an additional 2 hours at room temperature. Most of the ethyl acetate solvent was removed under vacuum on a rotary evaporator. The red product was dissolved in acetic acid (500 mL) and this solution drowned into approximately 2.5 l. of water with stirring. The product (19.3 g) was then collected by filtration, washed with water and dried in air. Mass spectrometry supports the following structure:

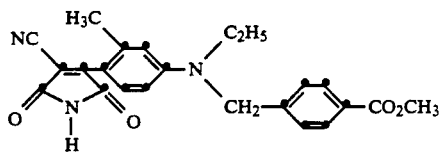

Example 10

A mixture of the colorant of Example 9 (9.7 g, 0.025 m), methyl 4 (chloromethyl)benzoate (7.4 g, 0.04 m), potassium carbonate (5.0 g) and N,N-dimethylformamide (100 mL) was heated for one hour at 90°–95° C. with stirring. The reaction mixture was allowed to cool and drowned into water to produce a sticky product which was washed by decantation and allowed to dry in air. Dissolving the product in acetic acid (200 mL) by warming and stirring and subsequently drowning into water (4.0 l) gave a solid, which was collected by filtration, washed with water and air dried (yield 10.5 g, 76.0% of the theoretical yield). Mass spectrometry supports the following structure:

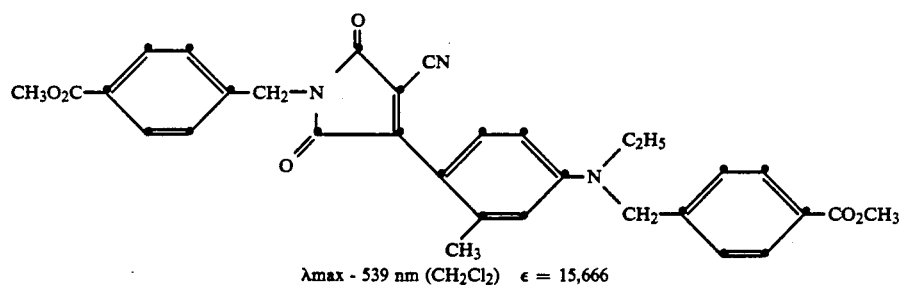

$\lambda$max - 539 nm (CH$_2$Cl$_2$)  $\epsilon$ = 15,666

The colorant has an absorption maximum ($\lambda$max) at 539 nm in the visible absorption spectrum in methylene chloride and an extinction coefficient of 15,666.

Example 11

The polymerization procedure of Example 4 was repeated using 0.0192 g of the colorant of Example 10. The resulting red polymer has an inherent viscosity of 0.45. An amorphous 14 mil film is bluish red which indicates good thermal stability of the colorant.

Example 12

N-(2-acetoxyethyl)-1,2,3,4-tetrahydro-2,2,4-trimethylquinoline (1.31 g, 0.005 m), 2-chloro-3-cyanomaleimide (0.80 g, 0.00516 m) and ethyl acetate (10.0 mL) were mixed and the reaction mixture was stirred at room temperature for about 15 minutes, heated to reflux by use of a steam bath and then allowed to cool. The product crystallized and was collected by filtration, washed with ethyl acetate and dried in air (yield 1.3 g, 68% of the theoretical yield). Mass spectrometry supports the following structure:

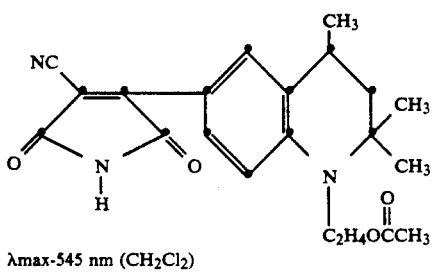

λmax-545 nm (CH$_2$Cl$_2$)

The colorant has an absorption maximum at 545 nm in the visible absorption spectrum in CH$_2$Cl$_2$ and an extinction coefficient of 30,843.

Example 13

The excellent thermal stability of the colorant of Example 12 was demonstrated by repeating the polymerization procedure of Example 4 using 0.0192 g of the colorant. The resulting bluish red polymer has an inherent viscosity of 0.55 and an amorphous film absorbs visible light strongly with a maximum absorbance at about 553 nm.

Example 14

A mixture of the colorant of Example 12 (0.38 g, 0.001 m) methyl 4-(chloromethyl) benzoate (0.30 g, 0.0016 m) potassium carbonate (0.3 g) and N,N-dimethyl-formamide (10 mL) was heated with stirring for 2 hours at 90°-95° C. The reaction mixture was allowed to cool and then drowned into water to give the product, which was collected by filtration, washed with water and dried in air (yield—0.45 g, 84.9% of the theoretical yield). Mass spectrometry supports the following structure:

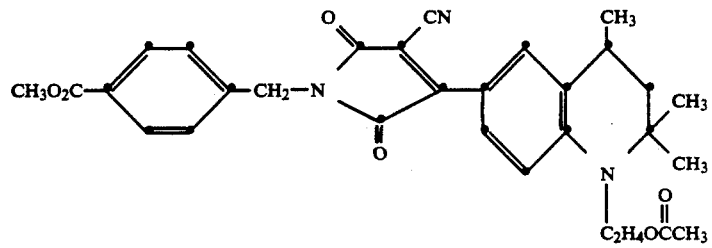

λmax-555 nm (CH$_2$Cl$_2$)

An absorption maximum (λmax) is observed at 555 nm in the visible absorption spectrum in CH$_2$Cl$_2$ and an extinction coefficient of 30,432.

Example 15

The polymerization procedure of Example 4 was repeated using 0.0192 g (200 ppm) of the colorant of Example 14 to give a bluish red polymer which has an inherent viscosity of 0.48. An amorphous 14 mil film absorbs visible light strongly with an absorption maximum at about 555 nm, which indicates excellent thermal stability.

Example 16

A mixture of 2-chloro-3-cyanomaleimide (0.78 g, 0.005 m), N-ethyl-2,3-dihydroindole (0.74 g, 0.005 m) and N,N-dimethylformamide (5.0 mL) was stirred for 1 hour at room temperature. Methanol (25 mL) was added with stirring to crystallize the product, which was collected by filtration, washed with methanol and dried in air (yield—0.35 g).

Example 17

The colorant of Example 16 (0 27 g, 0.001 m), ethyl bromoacetate (0.0015 m), potassium carbonate (0.2 g) and N,N-dimethylformamide (10 mL) were mixed and the reaction mixture stirred and heated at 90°-95° C. for 1 hour. Thin layer chromatography (50:50 acetone:hexane) shows some starting colorant still unalkylated. Additional quantities of ethyl bromoacetate (0.2 g) and potassium carbonate (0.2 g) were added and heating continued for 2 additional hours. The product was precipitated by drowning into water (25 mL) and was collected by filtration, washed with water and dried in air (yield—0.27 g). The colorant as evidenced by mass spectrometry consists mostly of the product having the structure

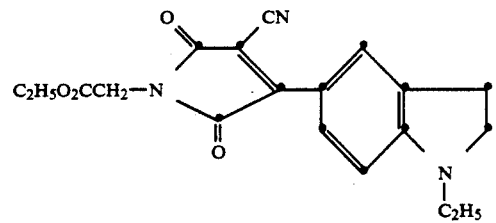

λmax-573 nm (CH$_2$Cl$_2$)

plus a small amount of the unalkylated starting colorant. An absorption maximum at 573 nm is observed in the visible absorption spectrum and the colorant has an extinction coefficient of 32,615 (CH$_2$Cl$_2$).

Example 18

The excellent thermal stability of the colorant prepared in Example 17 was demonstrated by repeating the polymerization procedure of Example 4 with 0.0192 g (200 ppm) of the colorant of Example 17 present to produce a violet polymer which has an inherent viscosity of 0.55.

Example 19

A solution of 2-chloro-3-cyanomaleimide (0.4 g, 0.0025 m) in ethyl acetate (15 mL) was mixed with a solution of 2-amino-3-carbomethoxythiophene (0.5 g, 0.0025 m) dissolved in ethyl acetate (20 mL) and the reaction mixture stirred for 2 hours. The crystalline dark red colorant thus produced was collected by filtration, washed with ethyl acetate and dried in air (yield-0.5 g, 72% of the theoretical yield). Mass spectrometry supports the following structure:

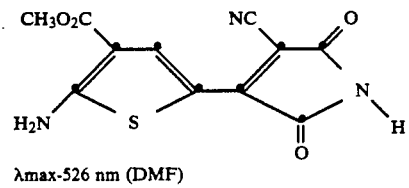

λmax-526 nm (DMF)

The colorant has an absorption maximum (λmax) at 526 nm and an extinction coefficient of 17,577 in N,N-dimethylformamide (DMF) solution.

Example 20

The polymerization reaction of Example 4 was repeated with 0.0192 g of the colorant of Example 19 present to produce a pink polymer having an inherent viscosity of 0.42. A 14 mil film prepared from this polymer shows a strong absorption of visible light with a maximum absorbance at about 537 nm in the absorption spectrum, which indicates excellent thermal stability of the colorant.

Example 21

A solution of 2-chloro-3-cyanomaleimide (0.4 g, 0.0025 m) dissolved in ethyl acetate (15 mL) was added to a stirred solution of N-methyl-2-phenylindole (0.52 g, 0.0025 m) dissolved in ethyl acetate (15 mL) and the mixture stirred at room temperature for 2.5 hours. The red colorant thus produced was collected by filtration, washed with ethyl acetate and dried in air (yield-0.3 g, 37% of the theoretical yield). The following structure is supported by mass spectrometry:

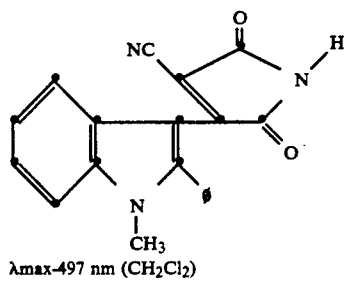

λmax-497 nm (CH$_2$Cl$_2$)

The red colorant has an absorption maximum at 497 nm in the visible absorption spectrum in methylene chloride and an extinction coefficient of 9,633.

Example 22

The polymerization reaction of Example 4 was repeated using 0.0192 g (200 ppm) of the colorant of Example 21 to give a yellowish red polymer having an inherent viscosity of 0.55. A 14 mil film molded from this polymer absorbs light strongly with a maximum absorbance at 496 nm, which indicates good thermal stability of the colorant.

Comparative Example 1

To 2-amino-3-carbomethoxy-4-methylthiophene (0.43 g, 0.0025 m) stirred in ethyl acetate (15 mL) was added 2-chloro-3-cyanomaleimide (0.40 g, 0.0026 m) and the reaction mixture heated at reflux for 1.0 hour. The colorant thus produced was collected by filtration, washed with ethyl acetate and dried in air (yield-0.56 g, 76.7% of the theoretical yield). Mass spectrometry supports the following structure:

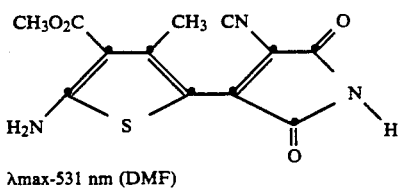

λmax-531 nm (DMF)

In the visible absorption spectrum in N,N-dimethylformamide (DMF) an absorption maximum is observed at 531 nm. The colorant has an extinction coefficient of 20,523.

Comparative Example 2

2-Amino-3-cyano-4-methylthiophene (0.69 g, 0.005 m) and 2-chloro-3-cyanomaleimide (0.80 g, 0.0052 m) were reacted by mixing in ethyl acetate 15 mL) and heating the reaction mixture at reflux for 5 minutes, followed by stirring for one hour while allowing to cool to room temperature. The crystalline product thus produced was collected by filtration, washed with ethyl acetate and dried in air (yield-1.25 g, 96.9% of the theoretical yield). Mass spectrometry supports the following structure:

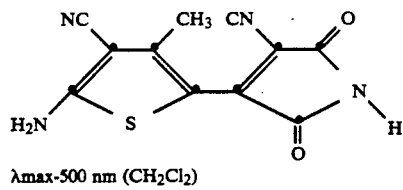

λmax-500 nm (CH$_2$Cl$_2$)

The colorant when dissolved in CH$_2$Cl$_2$ has an absorption maximum at 500 nm and an extinction coefficient ($\epsilon$) of 19,061.

Comparative Example 3

A solution of 2-amino-3-cyano-4-phenylthiophene (2.0 g, 0.01 m) dissolved in DMF (20 mL) was treated with 4-chloro-3-cyano-1,5-dihydro-5-oxo-2H-pyrrol-2-ylidenepropanedinitrile (2.24 g, 0.01) and the greenish-blue reaction mixture heated briefly on a steam bath and then allowed to cool. After being stirred for 4.0 hours at room temperature, water was added to precipitate the blue product, which was collected by filtration washed with water and dried in air (yield 3.1 g, 85% of the theoretical yield). The following structure is supported by mass spectrometry:

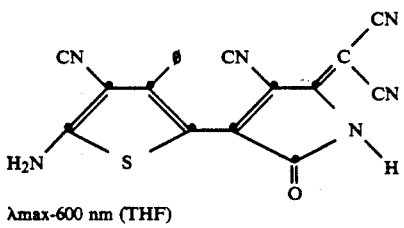

λmax-600 nm (THF)

An absorption maximum is observed at 600 nm (ε=21,868) in the visible absorption spectrum in tetrahydrofuran (THF).

Comparative Example 4

To 2-amino-3-phenylsulfonylthiophene (1.03 g, 0.005 m) stirred at room temperature in ethyl acetate (20 mL) was added 2-chloro-3-cyanomaleimide (0.78 g, 0.005 m) and the reaction mixture heated at 90°-95° C. for 0.5 hour and allowed to cool. The product was collected by filtration, washed with ethyl acetate and dried in air (yield-1.1 g, 61% of the theoretical yield). Mass spectrometry supports the following structure:

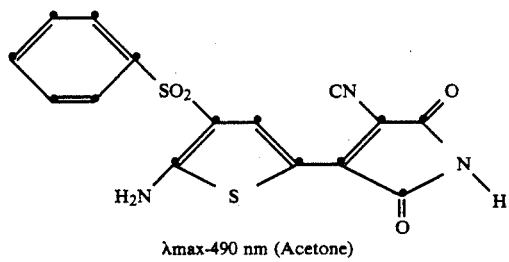

λmax-490 nm (Acetone)

In acetone, a visible absorption maximum is observed at 490 nm (ε=26,773) in the visible absorption spectrum.

Comparative Example 5

To 2-amino-4-phenylthiazole (3.52 g, 0.02 m) stirred in ethyl acetate (50.0 mL) was added 2-chloro 3-cyanomaleimide (3.12 g, 0.02 m) and the reaction mixture heated at reflux for about 5 minutes and then allowed to cool. The product was collected by filtration, washed with ethyl acetate and dried in air (yield 5.0 g). Mass spectrometry supports the following structure:

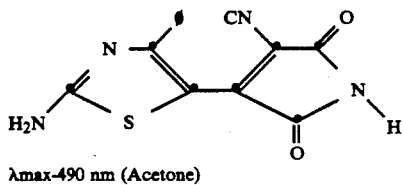

λmax-490 nm (Acetone)

An absorption maximum at 526 nm (ε=4,379) is observed in the visible absorption spectrum in methylene chloride.

Comparative Example 6

To a stirred solution of 1,3,3-trimethyl-2-methyleneindoline (1.73 g, 0.01 m) dissolved in methylene chloride (20 mL) was added 2-chloro-3-cyanomaleimide (1.60 g, 0.0102 m). Some warming and gas evolution occured. After being stirred at room temperature for about 4 hours, the reaction mixture was poured into an evaporting dish and the solvent allowed to evaporate. The residue was extracted with boiling hexane and the pale red extracts discarded. Ethanol was added and the mixture heated to boiling to dissolve the colorant. Water was added with stirring and the solid colorant crystallized upon cooling with ice. The solid was collected by filtration, washed with water and dried in air (yield—0.67 g, 22.8% of the theoretical yield). Mass spectrometry supports the following structure:

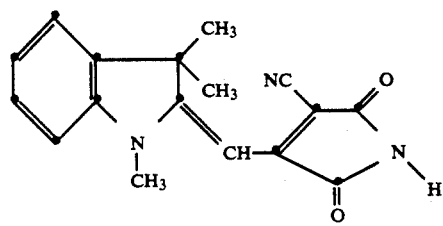

λmax-539 nm (CH2Cl2)

The magenta colorant has an absorption maximum at 539 nm (ε$_{max}$=30,048) in the visible absorption spectrum in methylene chloride.

Comparative Example 7

A solution of 1.12g (0.005 m) of 1,3-dihydro-2-methylene-1,1,3-trimethyl-2H-benz[e]indole dissolved in methylene chloride (10 mL) was treated with a 2-chloro-3-cyanomaleimide (0.94 g, 0.0060 m) with stirring at room temperature for 2 days. The reaction mixture was poured into an evaporating dish and the solvent allowed to evaporate. Isopropanol was added and heat applied to dissolve the bluish red colorant. Diethyl ether was added and a sticky product was obtained. The ether was removed by decantation and the product washed with hexane by decantation. The somewhat sticky product was dissolved in hot ethanol and then precipitated as a solid by addition of water to the mixture. After being collected by filtration, washed with water and dried in air, 0.34 g of colorant was obtained which is mostly I, with a small amount of the bis product II also present, as evidenced by mass spectrometry.

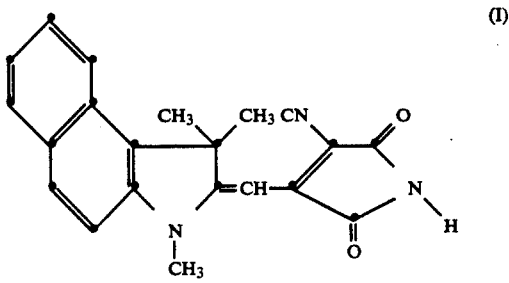

(I)

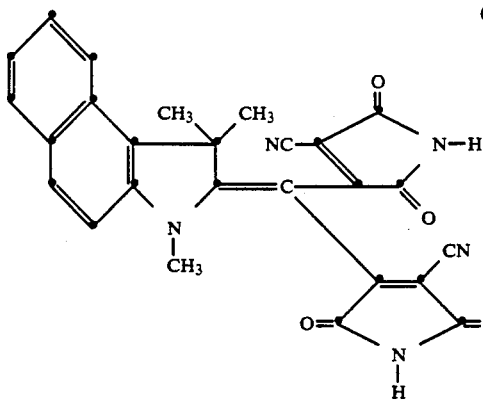

(II)

An absorption maximum is observed at 552 nm in the visible absorption spectrum in methylene chloride.

Comparative Example 8

A stirred solution of 1,3,3-trimethyl-2-methyleneindoline (0.87 g, 0.005 m) in methylene chloride (10 mL) was treated with 4-chloro-3-cyano-1,5-dihydro-5-oxo-2H-pyrrol-2-ylidenepropanedinitrile (1.02 g, 0.005 m) at room temperature. The blue reaction mixture was stirred at room temperature for 3.0 hours and then placed in an evaporating dish. After the solvent has been removed by evaporation, the residue was triturated with isopropanol-diethyl ether present and collected by filtration. The solid colorant was then reslurried in boiling isopropanol. After cooling, the colorant was collected by filtration and dried in air (yield-0.83 g, 49% of the theoretical yield). Mass spectrometry supports the following structure:

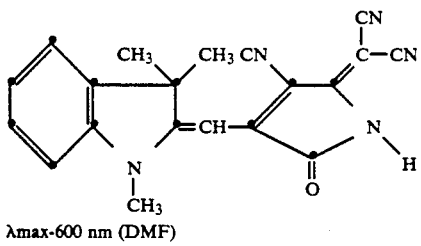

λmax-600 nm (DMF)

An absorption maximum at 600 nm ($\epsilon_{max}=21{,}762$) is observed in the visible absorption spectrum in N,N-dimethylformamide.

Comparative Example 9

A solution of 4-chloro-3-cyano-1,5-dihydro-5-oxo-2H-pyrrol-2-ylidenepropanedinitrile (204 mg) in N,N-dimethylformamide (1.85 g) was treated with 4-cyano-3-phenyl-2-(5H)-furanone (185 mg). The blue colorant was formed by warming the reaction mixture a few minutes on a steam bath. Addition of water failed to precipitate the product, which was found to be water soluble. The solution was then poured into an evaporating dish and solvent allowed to evaporate to give a blue product which was repeatedly reslurried in methylene chloride, collected by filtration and dried in air (yield—150 mg). The proposed structure is as follows as evidenced by mass spectrometry:

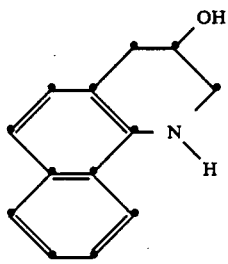

λmax-622 nm (Acetone)

An absorption maximum at 622 nm ($\epsilon_{max}=32{,}298$) in the visible absorption spectrum in acetone.

Comparative Example 10

A solution of 0.4 g (0.0025 m) of the compound having the structure dissolved in ethyl acetate (15 mL) was treated with a solution of 2-chloro-3-cyanomaleimide (0.50 g, 0.33 m) dissolved in ethyl acetate (20 mL) and the reaction mixture stirred at room temperature for 2 hours. The violet product precipitated and was collected by filtration, washed with ethyl acetate and dried in air (yield 0.70 g, 87.5% of the theoretical yield). Mass spectrometry supports the following structure:

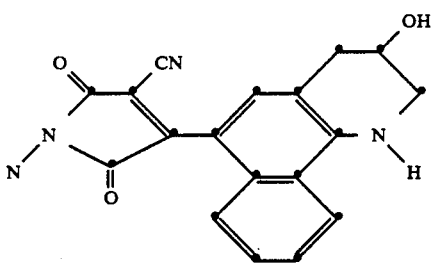

λmax-567 nm (CH2Cl2)

An absorption maximum is observed at 567 nm ($\epsilon_{max}=12{,}505$) in the visible absorption spectrum:

Comparative Example 11

A solution of 2-(N-methyl-N-phenylamino)-4-phenylthiazole (0.67 g, 0.0025 m) dissolved in ethyl acetate (15 mL) was combined with stirring with a solution of 2 chloro 3 cyanomaleimide (0.40 g, 0.0025 m) dissolved in ethyl acetate (15 mL) and the reaction mixture stirred at room temperature for 3 hours. The magenta product (yield 0.60 g, 62% of the theoretical yield) was obtained by filtering, washing with ethyl acetate and drying in air. Mass spectrometry supports the following structure:

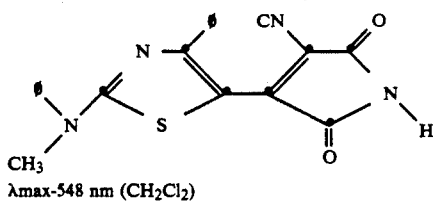

λmax-548 nm (CH₂Cl₂)

In the visible absorption spectrum in methylene chloride an absorption maximum is observed at 548 nm ($\epsilon_{max}$=10,968). ($\phi$=phenyl)

Comparative Example 12

A solution of a compound (0.48 g, 0.0025 m) having the structure

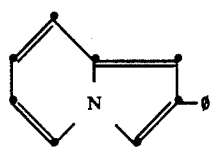

dissolved in ethyl acetate (25 mL) was combined with stirring with a solution of 2-chloro-3-cyanomaleimide (0.40 g, 0.0025 m) dissolved in ethyl acetate (15 mL). After allowing the reaction mixture to stir at room temperature for 2 hours, the violet product was collected by filtration, washed with ethyl acetate and dried in air (yield 0.70 g, 89.7% of the theoretical yield). Mass spectrometry supports the following proposed structure:

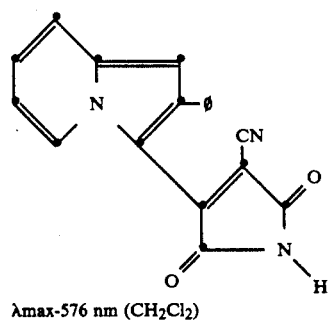

λmax-576 nm (CH₂Cl₂)

An absorption maximum is observed at 576 nm ($\epsilon_{max}$—8,933) in the visible absorption spectrum.

Comparative Example 13

A solution of the compound (3.14 g, 0.01 m) having the structure

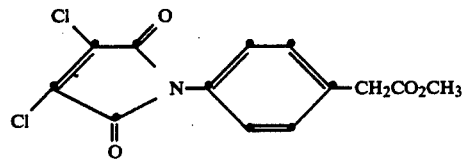

dissolved in N,N-dimethylformamide (25 mL) was treated with N,N-dimethylaniline (1.21 g, 0.01 m) and then with p-toluenesulfinic acid, Na salt (1.78 g, 0.01 m) at room temperature and the reaction mixture allowed to stand at room temperature for 1.5 hours. Water was then added to precipitate the solid magenta colorant, which was collected by filtration, washed with water and dried in air (yield 1.25 g). Mass spectrometry supports the following structure:

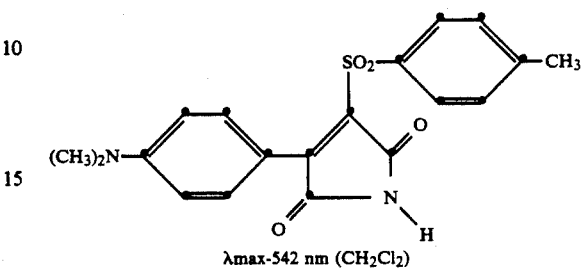

λmax-542 nm (CH₂Cl₂)

An absorption maximum at 542 nm ($\epsilon_{max}$=4,817) is observed in the visible absorption spectrum in methylene chloride.

Comparative Example 14

A reaction mixture of the starting dichloro maleimide compound of comparative Example 13 (1.57 g, 0.005 m), 2 amino 3 carbomethoxy 4 methylthiophene (0.86 g, 0.005 m), p toluenesulfinic acid, Na salt (1.0 g, 0.0056 m) and N,N-dimethylformamide (10 mL) was stirred at room temperature for 10 minutes and then drowned into water (100 mL) with stirring. The solid product thus produced was collected by filtration, washed with water and dried in air (yield 2.3 g, 80.9% of the theoretical yield). Mass spectrometry supports the following structure:

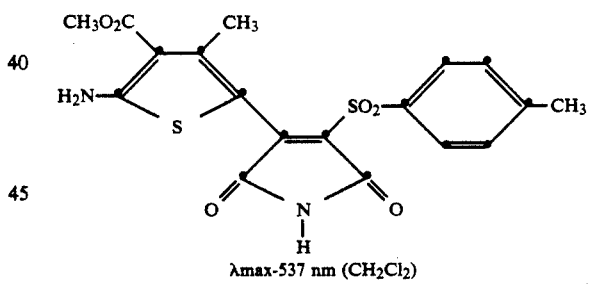

λmax-537 nm (CH₂Cl₂)

An absorption maximum is observed at 537 nm ($\epsilon_{max}$=6,422) in the visible absorption spectrum in methylene chloride.

Comparative Example 15

A reaction mixture of the dichloromaleimide compound of Comparative Example 13 (1.57 g, 0.005 m), N-[2-(acetyloxy)ethyl]-1,2,3,4-tetrahydro-2,2,4-trimethyl-quinoline (1.31 g, 0.005 m) p toluenesulfinic acid, Na salt (1.0 g, 0.0056 m) and N,N-dimethylformamide (10 mL) was stirred at room temperature for 10 minutes and then drowned into water (100 mL). The resulting product was sticky and was washed by decantation several times with water and allowed to dry in air. Methanol was added and the product crystallized from methanol, collected by filtration, washed with methanol, washed with water and dried in air (yield 1.04 g). Mass spectrometry supports the following structure:

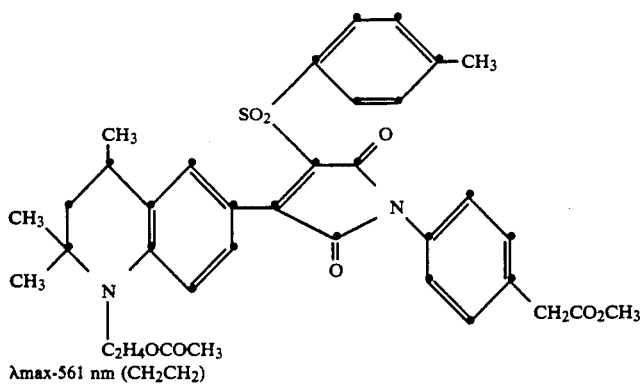

λmax-561 nm (CH₂CH₂)

An absorption maximum is observed at 551 nm ($\epsilon_{max}=17,962$) in the visible absorption spectrum in methylene chloride.

Comparative Example 16

The dichloromaleimide compound (2.36 g, 0.01 m) having the structure

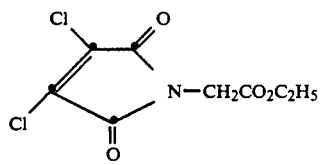

dissolved in 15 ml of acetic acid was reacted with 2-amino-3-carbomethoxy-4-methylthiophene (1.71 g, 0.01 m) and p-toluenesulfinic acid, Na salt (2.0 g) by stirring the reaction mixture at room temperature for 30 minutes. Isopropanol (50 mL) and then water (100 mL) were added gradually to the reaction mixture with stirring. The product, which was initially oily, crystallized upon standing for several hours at room temperature and was collected by filtration, washed with water and dried in air (yield—2.9 g, 57.3% of the theoretical yield). Mass spectrometry supports the following proposed structure:

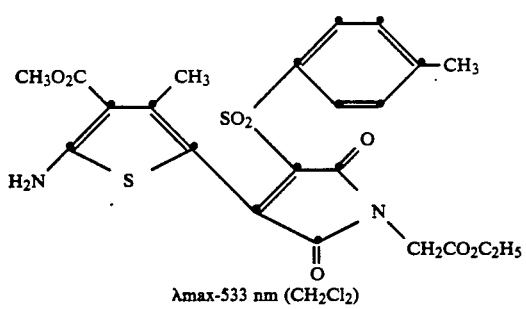

λmax-533 nm (CH₂Cl₂)

An absorption maximum is observed at 533 nm ($\epsilon_{max}=9,459$) in the visible absorption spectrum in methylene chloride.

Comparative Example 17

A solution of N,N-bis[2-(acetyloxy)ethyl]aniline (0.01 m) in 15 ml of ethyl acetate was treated at room temperature with 4-chloro-3-cyano-1,5-dihydro-5-oxo-2H-pyrrol-2-ylidenepropanedinitrile (0.01 m) and the reaction mixture stirred for 1 hour at room temperature. The reddish blue product was collected by filtration, washed with ethyl acetate and dried in air. Mass spectrometry supports the following proposed structure:

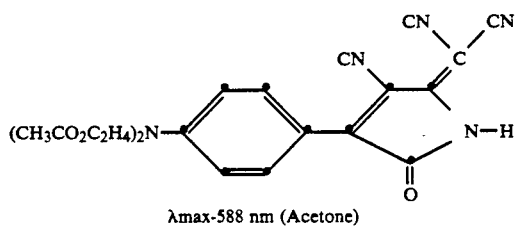

λmax-588 nm (Acetone)

An absorption maximum is observed at 588 nm ($\epsilon_{max}=15,684$) in the visible absorption spectrum in acetone.

Comparative Example 18

A solution of N,N-bis[2-(acetyloxy)ethyl]aniline (10.0 g) dissolved in tetrahydrofuran (75 mL) was treated with 5.0 g of tetracyanoethylene and the reaction mixture heated at reflux for 2.0 hours. The solvent was removed on a rotary evaporator and the red residual product crystallized from methanol to yield 1.5 g of pure colorant having the structure

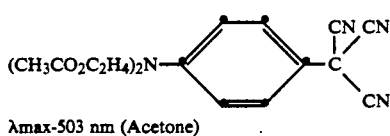

λmax-503 nm (Acetone)

as evidenced by mass spectrometry. An absorption maximum at 503 nm ($\epsilon_{max}=41,838$) is observed in the visible absorption spectrum in methylene chloride.

Comparative Examples 19-36

The poly(ethylene terephthalate) preparative procedure of Example 4 was repeated with 200 ppm of each of the colorants of Comparative Examples 1-18 added independently. Observation of the final polymer in each case showed that either the color of the initial colorant had been essentially completely destroyed or the final color of the polymer was greatly different from that of the starting colorant, thus establishing the fact that all of the colorants have poor thermal stability under conditions normally used for preparing poly(ethylene terephthalate). Table 1 gives a more detailed summary of the results.

Example 23

The following materials were placed in a 500 mL three-necked, round-bottom flask:
- 116.40 g (0.60 m) dimethyl terephthalate
- 81.00 g (0.90 m) 1,4-butanediol
- 0.0132 g Ti from a n butanol solution of titanium tetraisopropoxide
- 0.132 g (0.000404 m) colorant of Example 2

The flask was equipped with a nitrogen inlet, stirrer, vacuum outlet, and condensing flask. The flask and contents were heated in a Belmont metal bath with a nitrogen sweep over the reaction mixture as the temperature is increased to 200° C. and then to 220° C. over 2.5 hours. Vacuum was applied until the pressure was reduced to 0.5 mm Hg. The polycondensation is completed by heating the flask and contents at about 220° C. for 45 minutes under a pressure of 0.1 to 0.5 mm Hg. The vacuum was then relieved with nitrogen and methyl benzoate (125 mL) was added slowly and stirred to solution over about 10 minutes with the flask still in the metal bath. The resulting solution was transferred to a 2 L beaker and stirred until crystallization occurs. Hexane (700 mL) was added slowly with stirring to dilute the slurry and keep it stirrable.

The diluted slurry was stirred for 30 minutes, filtered and the cake washed with acetone. The cake was twice reslurried in acetone and then dried in air. The resulting magenta semicrystalline polyester powder, containing 0.10 weight percent of the colorant residue, has an inherent viscosity of 0.184, a melting temperature of 208° C., a weight average molecular weight of 11,484, a number average molecular weight of 7,684 and a poly-dispersity value of 1.49.

Example 24

The following materials were placed in a 500 mL three-necked, round-bottom flask:
- 116.40 g (0.60 m) dimethyl terephthalate
- 81.00 g (0.90 m) 1,4 butanediol
- 0.0132 g Ti from a n butanol solution of titanium tetraisopropoxide
- 0.132 g (0.000278 m) colorant of Example 5

The flask was equipped with a nitrogen inlet, stirrer, vacuum outlet, and condensing flask. The flask and contents were heated in a Belmont metal bath with a nitrogen sweep over the reaction mixture as the tempera ture is increased to 200° C. and then to 225° C. over 2.5 hours. Vacuum was applied until the pressure was reduced to 0.5 mm Hg. The polycondensation was completed by heating the flask and contents at about 225° C. for 45 minutes under a pressure of 0.1 to 0.5 mm Hg. The vacuum was then relieved with nitrogen and methyl benzoate (1 50 mL) added slowly and stirred to solution over about 1? minutes with the flask still in the metal bath. The resulting solution was transferred to a 2 L beaker and stirred until crystallization occured. Hexane (700 mL) was added slowly with stirring to dilute the slurry and keep it stirrable. The diluted slurry was stirred for 30 minutes, filtered and the cake washed with acetone. The cake was twice reslurried in acetone and then dried in air. The resulting magenta semicrystalline polyester powder (1 29.8 g), containing 0.10 weight percent of the colorant residue, has an inherent viscosity of 0.186, a melting temperature of 214° C., a weight average molecular weight of 10,603, a number average molecular weight of 7,331 and a poly-dispersity value of 1.44.

Example 25

A solution of N-methyldiphenylamine (14.6 g, 0.08 m) in ethyl acetate (200 mL) was treated at room temperature with 2-chloro-3-cyanomaleimide (24.8 g, 0.16 m) and the reaction mixture stirred at reflux for 8.0 hours and then cooled. The colorant was collected by filtration, washed with ethyl acetate and dried in air (yield 20.0 g). Mass spectrometry supports the following structure:

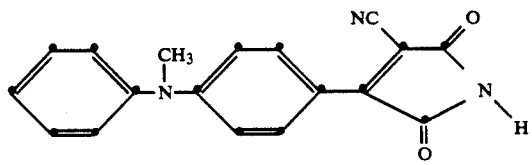

Example 26

A portion of the colorant of Example 25 (3.03 g, 0.01 m), N,N-dimethylformamide (50.0 mL), ethyl bromoacetate (2.50 g, 0.015 m) and sodium carbonate (5.0 g) were combined and the reaction mixture heated at 90°-95° C. with stirring for 1.5 hours.

The product was isolated by drowning into water and filtering, washed with water and dried in air. Mass spectrometry supports the following structure:

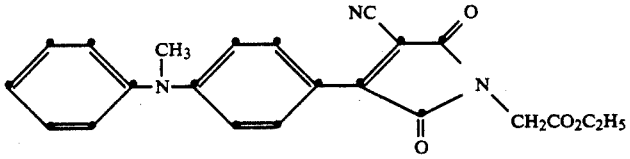

Example 27

The following materials were placed in a 500 mL three-necked, round-bottom flask:
- 116.40 g (0.60 m) dimethyl terephthalate
- 81.00 g (0.90 m) 1,4-butanediol
- 0.0132 g Ti from a n butanol solution of titanium tetraisopropoxide
- 0.132 g (0.000339 m) colorant of Example 26

The flask was equipped with a nitrogen inlet, stirrer, vacuum outlet, and condensing flask. The flask and contents were heated in a Belmont metal bath with a nitrogen sweep over the reaction mixture as the tempera ture is increased to 200° C. and then to 225° C. over 2 hours. Vacuum was applied until the pressure was reduced to 0.5 mm Hg. The polycondensation was completed by heating the flask and contents at about 225° C. for 30 minutes under a pressure of 0.1 to 0.5 mm Hg. The vacuum was then relieved with nitrogen and methyl benzoate (125 mL) added slowly and stirred to solution over about 10 minutes with the flask still in the metal bath. The resulting solution was transferred to a 2

L beaker and stirred until crystallization occured. Acetone (700 mL) was added slowly with stirring to dilute the slurry and keep it stirrable. The diluted slurry was stirred for 30 minutes, filtered and the cake washed with acetone. The cake was twice reslurried in acetone and then dried in air. The resulting violet semicrystalline polyester powder (129.8 g), contains 0.10 weight percent of the colorant residue.

Example 28

To a solution of N,N-bis[2 (acetyloxy)ethyl]-aniline (1.33 g, 0.005 m) dissolved in methanol (10 mL) was added 2 chloro 3 cyanomaleimide (0.78 g, 0.005 m) and the reaction mixture heated for 15 minutes at reflux. After cooling, the solid red colorant was collected by filtration, washed with water, washed further with hexane and dried in air (yield 0.50 g, 26% of the theoretical yield). Mass spectrometry supports mostly the following structure

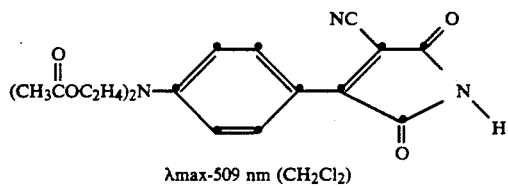

λmax-509 nm (CH₂Cl₂)

with minor ions present for the mono and dideacetylated products.

Example 29

The following materials were placed in a 500 -mL three-necked, round-bottom flask:
135.8 g (0.70 m) dimethyl terephthalate
94.6 g (0.91 m) 2,2-dimethyl-1,3-propanediol
0.0164 g Ti from a n butanol solution of titanium tetraisopropoxide
0.37 g (0.001 m) colorant of Example 28

The flask was equipped with a nitrogen inlet, stirrer, vacuum outlet, and condensing flask. The flask and contents were heated in a Belmont metal bath with a nitrogen sweep over the reaction mixture as the temperature is increased to 200° C. and then to 220° C. over 90 minutes. Over the next 30 minutes the temperature was increased to about 240° C. and then to about 260° C. over the next 30 minutes, The temperature was quickly raised (over about 15 minutes) to 275° C. with a stream of nitrogen bleeding into the system and a vacuum was applied until the pressure was reduced to 0.5 mm Hg. The polycondensation was completed by heating the flask and contents at about 275° C. for about 1.25 hours under a pressure of 0.1 to 0.5 mm Hg. The flask was removed from the metal bath and allowed to cool while the polymer solidified. The resulting high molecular weight red polyester, containing 0.225 weight percent of the colorant residue, has an inherent viscosity of 0.41, no melting temperature, a weight average molecular weight of 25,780, a number average molecular weight of 8,546 and a polydispersity value of 3,017.

Example 30

A portion (50.0 g) of the amorphous color concentrate prepared in Example 29 was granulated using a Wiley mill and added portionwise to toluene (200 mL) stirred in an explosion proof Waring blender. After complete addition, stirring was continued at full speed for about 20 minutes and with the temperature rising to about 80° C. Additional toluene was added to rinse down the walls of the blender container and the mixture allowed to stand overnight to produce solid semicrystalline material. The volume of the mixture was doubled by the addition of acetone. The solid product was collected by filtration and then reslurried four times in acetone by stirring in the Waring blender followed by filtration after each reslurry. After drying in air, the red semi crystalline polyester powder weighed 46.2 g, and has an inherent viscosity of 0.42, a weight average molecular weight of 25,702, a number average molecular weight of 10,332 and a polydispersity value of 2.48.

Example 31

A solution of N [2,3-(diacetyloxy)propyl]-1,2,3,4-tetrahydro-2,2,4,7-tetramethylquinoline (1.7 g, 0.005 m) dissolved in N,N-dimethylformamide (10 mL) was treated with 2-chloro-3-cyanomaleimide (0.78 g, 0.005 m) and then the reaction mixture was heated at 80° C. for 1 hour. The cooled reaction mixture was drowned into water and the sticky product washed by decantation. Solid product was produced by dissolving in methanol followed by drowning into water. Filtration, washing with water, and drying in air provided 0.5 g of red colorant having the structure

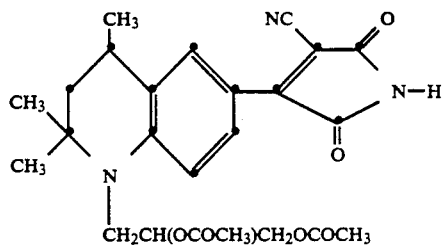

as evidenced by mass spectrometry. An absorption maximum is observed at 520 nm in the visible absorption operation in methylene chloride.

Example 32

155.2 g (0.80 mol) dimethyl terephthalate
99.2 g (1.60 mol) ethylene glycol
0.01536 g Ti from a n butanol solution of titanium tetraisopropoxide
0.77 g (0.00165 m) of colorant of Example 31

The flask was equipped with a nitrogen inlet, stirrer, vacuum outlet, and condensing flask. The flask and contents were heated at 200° C. in a Belmont metal bath for 60 min, at 210° C. for 75 min, and at 220° C. for 50 min with a nitrogen sweep over the reaction mixture. The temperature of the bath was increased to 275° C. With a stream of nitrogen bleeding in the system, vacuum was applied slowly at 275° C. over a 10 min period until the pressure was reduced to 0.5 mm Hg. The flask and contents were heated at 275° C. under a pressure of 0.1 to 0.5 mm Hg for 45 min. The flask was removed from the metal bath and allowed to cool while the polymer crystallized. The resulting polymer has an inherent viscosity of 0.67 measured in a 60/40 ratio by weight of phenol/tetrachloroethane at a concentration of 0.5 g per 100 mL, a weight average molecular weight of 47,144, a number average molecular weight of 14,638, a polydispersity value of 3.216 and contains 0.50 weight percent of the colorant copolymerized therein.

Example 33

The following materials were placed in a 500 -mL three-necked, round-bottom flask:
- 55.70 g (0.287 m) dimethyl terephthalate
- 40.50 g (0.045 m) 1,4 butanediol
- 0.071 g Ti from a n butanol solution of titanium tetraisopropoxide
- 7.10 g (0.0129 m) colorant of Example 10

The flask was equipped with a nitrogen inlet, stirrer, vacuum outlet, and condensing flask. The flask and contents were heated in a Belmont metal bath with a nitrogen sweep over the reaction mixture as the temperature was increased to 200° C. and then to 230° C. over 2 hours. Over the next 1 hour, the temperature was increased to about 250° C. Vacuum was applied until the pressure was reduced to 0.5 mm Hg. The polycondensation was completed by heating the flask and contents at about 250° C. for 45 minutes under a pressure of 0.1 to 0.5 mm Hg. The polymer thus prepared was dark red in color, contains about 10 percent by weight of the copolymerized colorant residue, has a melting temperature of 214° C., a weight average molecular weight of 56,760, a number average molecular weight of 19,970, a polydispersity value of 2.84 and an inherent viscosity of 0.68.

The scope of the invention is further shown by the examples in Tables 2-5.

TABLE 1

Comparative Examples 19-36
Thermal Stability of Comparative Colorants in Poly(Ethylene Terephthalate) Preparation

| Comparative Example | Colorant Comparative Example | Color of Starting Colorant | Final Color of Polymer |
| --- | --- | --- | --- |
| 19 | 1 | Red | Pale Yellow |
| 20 | 2 | Red | Pale Tan |
| 21 | 3 | Blue | Pale Tan |
| 22 | 4 | Orange | Pale Pink |
| 23 | 5 | Red | Pale Yellow |
| 24 | 6 | Magenta | Pale Tan |
| 25 | 7 | Violet | Pale Tan |
| 26 | 8 | Blue | Pale Tan |
| 27 | 9 | Cyan | Pale Tan |
| 28 | 10 | Violet | Pale Gray |
| 29 | 11 | Magenta | Very Pale Violet |
| 30 | 12 | Violet | Pale Gray |
| 31 | 13 | Red | Pale Yellow |
| 32 | 14 | Magenta | Pale Yellow |
| 33 | 15 | Violet | Pale Orange |
| 34 | 16 | Magenta | Pale Beige |
| 35 | 17 | Reddish-Blue | Very Pale Pink |
| 36 | 18 | Red | Very Pale Pink |

TABLE 2

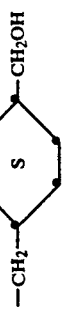

| Ex. No. | R | R₁ | R₂ | R₃ |
|---|---|---|---|---|
| 34 | CH₂CH₂OH | H | C₂H₅ | C₂H₄OH |
| 35 | CH₂CH=CH₂ | H | C₂H₄OH | C₂H₄OH |
| 36 | CH₂CH₂CO₂C₂H₅ | H | C₂H₅ | CH₂CH₂CO₂C₂H₅ |
| 37 | CH₂C₆H₁₁ | H | C₆H₁₁ | CH₂CH₂OH |
| 38 | CH₂C₆H₄-p-CO₂CH₃ | H | CH₃ | CH₂C₆H₄-p-CO₂CH₃ |
| 39 | CH₂CO₂C₂H₅ | 3-CH₂OH | CH₃ | CH₃ |
| 40 | CH₂CH₂OCOCH₃ | 3-CH₂CH₂OCOCH₃ | CH₂CH₂OCOCH₃ | CH₃ |
| 41 | C₆H₄-p-CO₂CH₃ | 3-CH₃ | C₂H₅ | CH₂CH₂OCOC₂H₅ |
| 42 | C₆H₄-p-CH₂COOH | 3-Cl | CH₂CH₂COOH | CH₂COOH |
| 43 | C₆H₄-p-CH₂CO₂CH₃ | 3-Br | CH₂CH₂CH₃ | CH₂CH₂OCH₂COCH₃ |
| 44 | C₆H₄-p-CH₂OCOCH₃ | H | CH₂CH(CH₃)₂ | CH₂CH₂SCH₂CH₂OH |
| 45 | —CH₂—⟨S⟩—CH₂OH | H | C₂H₅ | C₂H₄OH |
| 46 | CH₂C(CH₃)₂OH | H | C₆H₅ | CH₂CH₂OCOCH₃ |
| 47 | (CH₂)₄OH | H | C₅H₉ | (CH₂)₄OH |
| 48 | CH₂CH₂OCH₂CH₂OH | H | CH(CH₃)₂ | CH₂CH(CH₃)OH |
| 49 | CH₂CH₂SO₂CH₂CH₂OH | H | C₇H₁₃ | CH₂SO₂C₂H₄OH |
| 50 | CH₂CH₂OC₆H₄-p-CO₂CH₃ | H | C₄H₉-n | CH₂COCH₂CN |
| 51 | CH₂C₆H₁₁ | NHCOCH₃ | CH₂CH₂OCOCH₃ | CH₂CH₂OCOCH₃ |
| 52 | CH₂C≡CH | NHCOC₆H₅ | CH₂CH₂OCO₂C₂H₅ | CH₂CH₂OCO₂C₂H₅ |
| 53 | CH₂CH(C₂H₅)C₄H₉-n | 3-NHCO₂C₂H₅ | CH₂CH₂OCOCH₃ | CH₂CH₂OCH₂OCOCH₃ |
| 54 | C₄H₉-n | 3-NHCOC₆H₁₁ | CH₂CH₃ | CH₂CH(OH)CH₂OH |
| 55 | H | 3-NHSO₂CH₃ | CH₂CH₃ | CH₂CH(OCOCH₃)CH₂OCOCH₃ |
| 56 | H | 3-NHSO₂C₆H₅ | CH₂CH₂OCH₂CH₂OCOCH₃ | CH₂CH₂OCH₂OCOCH₃ |
| 57 | CH₂CH(OH)CH₂OH | H | CH₃ | CH₃ |
| 58 | CH₂CO₂CH₃ | H | C₆H₅ | —CH₂CH₂SO₂CH₂CH₂— |
| 59 | CH₂CH₂OH | H | C₂H₅ | —CH₂CH₂SCH₂CH₂— |
| 60 | CH₂CH₂OH | H | CH₂CH₂OH | —CH₂CH₂OCH₂CH₂— |
| 61 | CH₂CH(OCOCH₃)CH₂OCOCH₃ | H | CH₂CH₂OH | —CH₂CH₂N(COCH₃)CH₂CH₂— |
| 62 | CH₂CH₂CO₂C₂H₅ | H | CH₂CH₂OH | —CH₂CH₂CH₂CH₂— |
| 63 | CH₂CH₂CO₂C₂H₄OH | H | CH₂CH₂OH | —CH₂CH₂CH₂CH₂— |
| 64 | H | 3-OC₂H₄OH | C₆H₅ | CH₂CH₂OCOCH₃ |
| 65 | H | 2-OCH₃-5-CH₃ | C₂H₅ | CH₂CH₂OCOCH₃ |
| 66 | CH₃ | 2,5-di-OCH₃ | CH₂CH₂OCOC₆H₁₁ | CH₂CH₂OCOCH₃ |
| 67 | H | 2-OCH₃-5-NHCOC₆H₅ | CH₂CH₂OH | CH₂CH₂OH |
| 68 | CH₂CH₂OCH₂CH₂OH | H | C₂H₅ | CH₂CH₂OC₆H₄-p-COOH |
| 69 | CH₂CH₂CO₂CH₂C₆H₅ | H | C₂H₅ | CH₂CH₂OC₆H₄-m-CO₂CH₃ |

TABLE 2-continued

[Structure: aniline coupled with cyano-pyrrolidinedione type chromophore, with substituents R, R₁, R₂, R₃]

| Ex. No. | R | $R_1$ | $R_2$ | $R_3$ |
|---|---|---|---|---|
| 70 | $CH_2C_6H_4$-p-$CH_2CO_2CH_3$ | H | $C_2H_5$ | $CH_2CH_2SC_6H_4$-o-COOH |
| 71 | $CH_2CO_2C_2H_5$ | H | $C_2H_5$ | $CH_2$-(3-$SO_2NHCH_2CO_2C_2H_5$-phenyl) |
| 72 | H | H | $C_2H_5$ | $CH_2$-(3-$SO_2N(C_2H_4OH)_2$-phenyl) |
| 73 | H | H | $C_2H_5$ | $CH_2CH_2O$-(4-$SO_2N(C_2H_4OH)_2$-phenyl) |
| 74 | $CH_2CO_2C_2H_5$ | H | $C_2H_5$ | —$CH_2CH_2N(C_2H_4OH)CH_2CH_2$—CH($CH_3$)$CH_2CO_2C_2H_5$ |
| 75 | $CH_2CO_2C_2H_5$ | H | $C_2H_5$ | |
| 76 | $CH_2$-(4-$CO_2CH_3$-phenyl) | 3-NHCO-(4-$CO_2CH_3$-phenyl) | $C_2H_5$ | $C_2H_5$ |
| 77 | $CH_2COOH$ | H | $C_2H_5$ / $CH_2CH_2OH$ | $CH_2CH_2COOH$ |
| 78 | $CH_2COOH$ | H | | $C_6H_5$ |
| 79 | $CH_2CO_2C_2H_5$ | H | $C_2H_5$ | $CH_2CH_2OCNHC_2H_5$ (C=O) |

TABLE 2-continued

[Structure: phenyl ring with NR₂R₃ group and R₁ substituent, connected via C=C(CN) to a ring containing N-R with two C=O groups]

| Ex. No. | R | R₁ | R₂ | R₃ |
|---|---|---|---|---|
| 80 | $CH_2CO_2C_2H_4Cl$ | H | $C_2H_5$ | $CH_2CH_2OCNHC_6H_5$ (with C=O) |
| 81 | $CH_2CO_2C_2H_4CN$ | H | $C_2H_5$ | $CH_2CH_2OCN(C_2H_5)_2$ (with C=O) |
| 82 | $CH_2CH_2OCO_2C_2H_5$ | H | $C_2H_5$ | $CH_2CH_2OCO_2C_2H_5$ |
| 83 | $CH_2CH_2CN$ | H | $C_2H_4OCOCH_3$ | $C_2H_4O_2COCH_3$ |
| 84 | $CH_2CH_2CONH_2$ | H | $C_2H_4OCOH$ | $C_2H_4O_2COH$ |

TABLE 3

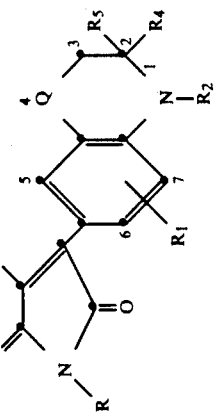

| Ex. No. | R | R₁ | R₂ | R₄ | R₅ | Q |
|---|---|---|---|---|---|---|
| 85 | CH₂CO₂C₂H₅ | H | CH₂CH₂OCOCH₃ | H | H | —CH₂— |
| 86 | CH₂CO₂CH₃ | H | CH₂CH₂OCOC₂H₅ | CH₃ | H | —CH₂— |
| 87 | CH₂CH₂OH | H | CH₂CH₂OH | CH₃ | H | —CH₂— |
| 88 | CH₂C₆H₄-p-CO₂CH₃ | H | CH₂C₆H₄-p-CO₂CH₃ | H | H | —CH₂— |
| 89 | CH(CH₃)CO₂C₂H₅ | H | CH(CH₃)CO₂H | H | H | —CH₂— |
| 90 | CH₂CO₂C₄H₉-n | H | CH₂CH₂OCH₂CH₂OH | CH₃ | CH₃ | —CH(CH₃)— |
| 91 | CH₂CH₂CO₂C₂H₅ | 7-CH₃ | CH₂CH₂OH | CH₃ | CH₃ | —CH(CH₃)— |
| 92 | CH₂CH₂OCH₂CH₂OH | 7-OC₂H₅ | CH₂C₆H₄-p-CO₂CH₃ | CH₃ | CH₃ | —CH(CH₃)— |
| 93 | CH₂C₆H₅ | 7-NHCOCH₃ | CH₂CH₂OH | CH | CH₃ | —CH(CH₃)— |
| 94 | CH₂C₆H₁₁ | 7-NHCOC₆H₅ | CH₂CH₂OCOCH₃ | CH₃ | H | —CH₂— |
| 95 | CH₂CH=CH₂ | H | CH₂CH₂OC₆H₄m-CO₂CH₃ | CH₃ | H | —CH₂— |
| 96 | (—CH₂)₄CO₂C₂H₅ | 7-NHSO₂CH₃ | CH₂CH₂OCOCH₃ | CH₃ | CH₃ | —CH(CH₃)— |
| 97 | CH₂CO₂C₂H₅ | 7-CH₂OCOCH₃ | CH₂CH(CH₃)OH | CH₃ | CH₃ | —CH(CH₃)— |
| 98 | H | 7-CH₂OH | C₂H₅ | CH₃ | CH₃ | —CH(CH₃)— |
| 99 | H | H | CH₂CH(OCO₂C₂H₅)CH₂OCO₂C₂H₅ | CH₃ | CH₃ | —CH(CH₃)— |
| 100 | H | H | CH₂C₆H₄-p-CO₂CH₃ | CH₃ | CH₃ | —CH(CH₃)— |
| 101 | CH₃ | H | CH₂CH₂OC₆H₄-m-CO₂CH₃ | CH₃ | CH₃ | —CH(CH₃)— |
| 102 | C₂H₅ | H | ![SO₂N(C₂H₄OH)₂ phenyl-CH₂] | H | H | —CH₂— |
| 103 | C₆H₁₁ | H | ![SO₂NH-diester-CH₂—C₆H₄O] | H | H | —CH₂— |
| 104 | CH₂CH₂OH | H | CH₂C₆H₁₁ | H | H | —CH₂— |
| 105 | CH₂C≡CH | H | CH₂CH₂OCOCH₂OH | H | H | —CH₂— |
| 106 | CH₂C₆H₄-p-CO₂CH₃ | H | CH₂CH₂OCONHC₆H₅ | H | H | —CH₂— |
| 107 | CH₂CO₂C₂H₅ | H | CH₂CH₂OCONH₂ | H | H | —CH₂— |

TABLE 3-continued

| Ex. No. | R | R₁ | R₂ | R₄ | R₅ | Q |
|---|---|---|---|---|---|---|
| 108 | CH₂C(CH₃)₂CH₂OH | H | CH₂CH₂OH | H | H | —CH₂— |
| 109 | CH₂CH(OH)CH₂OH | H | C₂H₅ | CH₃ | CH₃ | —CH(CH₃)— |
| 110 | CH₂CH₂OH | 5-CH₃-8-OCH₃ | CH₂CH₂OH | CH₃ | CH₃ | —CH(CH₃)— |
| 111 | CH₂CH₂OCOCH₃ | 8-OCH₃ | CH₂CH₂OCOCH₃ | CH₃ | H | —CH₂— |
| 112 | CH₂CO₂H | H | CH₂CH₂OCOCH₃ | H | H | —O— |
| 113 | CH₂CO₂C₂H₅ | H | CH₂C₆H₄-p-CO₂CH₃ | H | H | —O— |
| 114 | CH₂C₆H₄-p-CO₂CH₃ | H | CH₂CH₂OCOCH₃ | CH₃ | H | —O— |
| 115 | CH₂CH₂OH | H | CH₂CH₂OH | CH₃ | H | —O— |
| 116 | C₂H₅ | 7-CH₃ | CH₂CH(OCOCH₃)CH₂OCOCH₃ | CH₃ | H | —O— |
| 117 | H | 7-NHCOC₂H₅ | CH₂CH₂OCH₂CH₂OH | CH | H | —O— |
| 118 | CH₂CO₂C₂H₅ | H | CH₃ | CH₃ | H | —O— |
| 119 | CH₂CH=CH₂ | H | CH₂CH₂OCO₂C₂H₅ | CH₃ | H | —O— |
| 120 | CH₂CH(OH)CH₂OH | H | C₄H₉-n | CH₃ | H | —O— |
| 121 | CH₂CH(OCOCH₃)CH₂OCOCH₃ | H | CH₂C₆H₅ | CH₃ | H | —O— |
| 122 | ![structure: 3,5-bis(CO₂CH₃)-phenyl-OCH₂CH₂—] | H | C₂H₅ | CH₃ | H | —O— |

TABLE 4

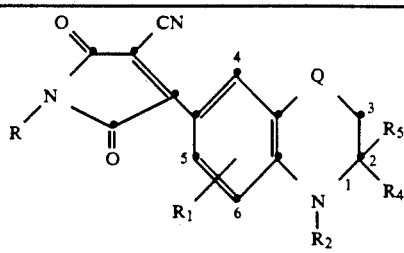

| Ex. No. | R | R₁ | R₂ | R₄ | R₅ | Q |
|---|---|---|---|---|---|---|
| 123 | $CH_2CO_2C_2H_5$ | H | $C_2H_4OCOCH_3$ | H | H | Covalent Bond |
| 124 | $CH_2CH_2OCOCH_3$ | H | $C_2H_4OCOCH_3$ | $CH_3$ | H | Covalent Bond |
| 125 | $CH_2C_6H_4\text{-}p\text{-}CO_2CH_3$ | H | $CH_2C_6H_4\text{-}p\text{-}CO_2CH_3$ | H | H | Covalent Bond |
| 126 | H | H | $CH_2CH(OCOCH_3)CH_2OCOCH_3$ | H | H | Covalent Bond |
| 127 | $CH_2CO_2C_2H_5$ | H | $CH_2CH_2OH$ | $CH_3$ | H | Covalent Bond |
| 128 | $CH_2CH(OH)CH_2OH$ | H | $C_2H_5$ | H | H | Covalent Bond |
| 129 | $C_2H_5$ | H | $CH_2CH_2OCH_2CH_2OH$ | H | H | Covalent Bond |

TABLE 5

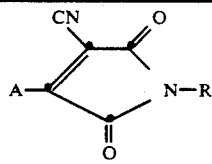

| Ex. No. | R | A |
|---|---|---|
| 130 | $CH_2CO_2C_2H_5$ | 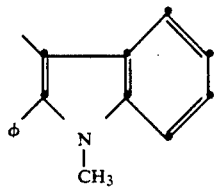 |
| 131 | $CH_2C_6H_4\text{-}p\text{-}CO_2CH_3$ | 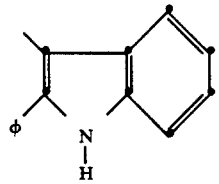 |
| 132 | $CH_2CH_2OCOCH_3$ | 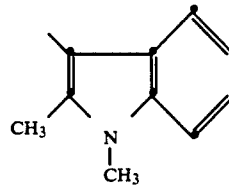 |
| 133 | $CH_2CH_2OH$ | 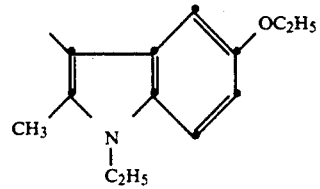 |

TABLE 5-continued

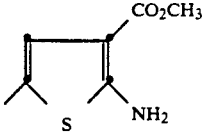

| Ex. No. | R | A |
|---|---|---|
| 134 | CH$_2$CO$_2$C$_2$H$_5$ | thiophene with CO$_2$CH$_3$ and NH$_2$ |
| 135 | CH$_2$C$_6$H$_4$-p-CO$_2$CH$_3$ | thiophene with CO$_2$C$_2$H$_5$ and NH$_2$ |
| 136 | CH$_2$C$_6$H$_5$ | thiophene with CO$_2$C$_4$H$_9$-n and NH$_2$ |
| 137 | CH$_2$C$_6$H$_{11}$ | thiophene with CO$_2$CH(CH$_3$)$_2$ and NH$_2$ |
| 138 | CH$_2$CH=CH$_2$ | thiophene with CO$_2$CH$_2$CH=CH$_2$ and NH$_2$ |
| 139 | H | thiophene with CO$_2$C$_2$H$_4$OC$_2$H$_5$ and NH$_2$ |
| 140 | C$_2$H$_5$ | thiophene with CO$_2$C$_6$H$_{11}$ and NH$_2$ |
| 141 | C$_4$H$_9$-n | thiophene with CO$_2$C$_4$H$_9$-n and NH$_2$ |
| 142 | CH$_2$CH$_2$CO$_2$C$_2$H$_5$ | thiophene with CO$_2$C$_6$H$_5$ and NH$_2$ |

TABLE 5-continued
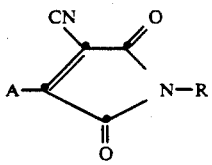
| Ex. No. | R | A |
|---|---|---|
| 143 | CH2CH2OC6H4-m-CO2CH3 | 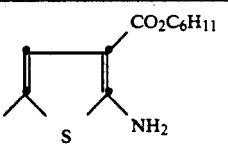 |
| 144 | CH2C(CH3)2CH2OH | 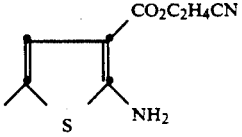 |
| 145 | CH2CH(OH)CH2OH | 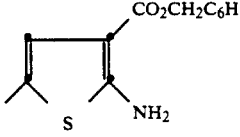 |
| 146 | CH2CO2C2H5 | 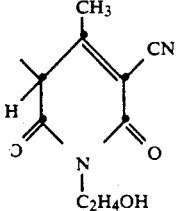 |
| 147 | CH2C6H4-p-CO2CH3 | 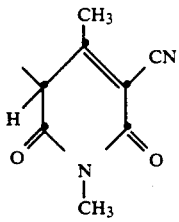 |
| 148 | H | 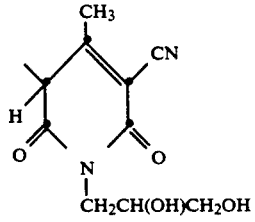 |
| 149 | CH2CO2CH3 | 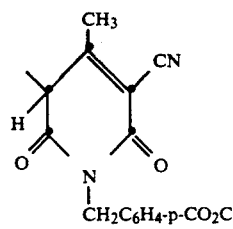 |

TABLE 5-continued

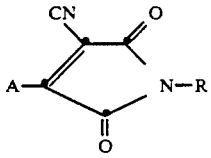

| Ex. No. | R | A |
|---|---|---|
| 150 | CH₂CH₂OCOCH₃ | 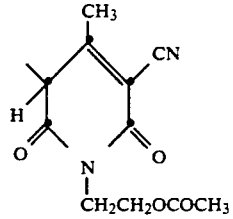 |

We claim:
1. A polyester composition having copolymerized therein or reacted therewith 0.001 to 50 weight percent of a residue of Formula (I):

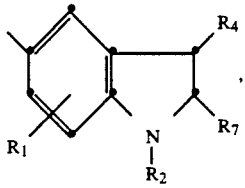 (I)

wherein R is hydrogen, unsubstituted or substituted $C_1$-$C_{10}$ alkyl; unsubstituted or substituted $C_3$-$C_8$ cycloalkyl; $C_3$-$C_8$ alkenyl; $C_3$-$C_8$ alkynyl; phenyl and substituted phenyl;

A is represented by one of the following formulae:

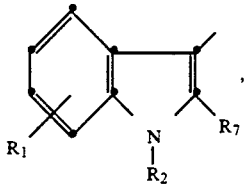

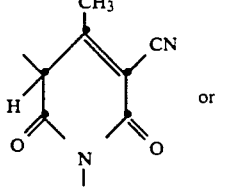

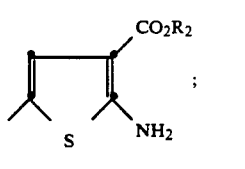

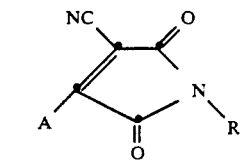

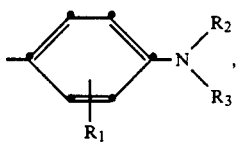

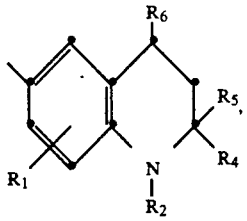 or

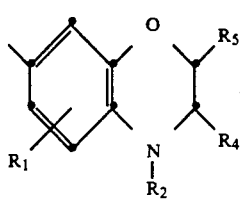 ;

wherein $R_1$ is hydrogen or 1 or 2 groups selected from $C_1$-$C_4$ alkyl, $C_1$-$C_4$ alkoxy, O—$C_1$—$C_4$ alkylene—OH, O—$C_1$—$C_4$ alkylene—$C_1$-$C_4$ alkanoyloxy, $C_1$-$C_4$ alkylene—OH, $C_{14}C_4$ alkylene—$C_1$-$C_4$ alkanoyloxy, halogen, $C_1$-$C_4$ alkanoylamino, $C_3$-$C_8$ cycloalkylcarbonylamino, $C_1$-$C_4$ alkylsulfonylamino, arylsulfonylamino, arylaminocarbonylamino or arylcarbonylamino;

$R_2$ and $R_3$ are independently selected from unsubstituted or substituted $C_1$-$C_{10}$ alkyl; unsubstituted or substituted $C_3$-$C_8$ cycloalkyl; $C_3$-$C_8$ alkenyl; $C_3$-$C_8$ alkynyl; unsubstituted or substituted phenyl; or $R_2$ and $R_3$ may be combined with the nitrogen to which they are attached to form an A radical having the formula

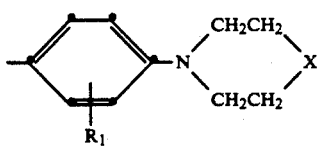

wherein X is selected from a covalent bond, —CH$_2$—, —O—, —S—, —SO$_2$—, —C(O)—, —CO$_2$—, —NH—, —N(COC$_1$-C$_4$ alkyl)—, —N(SO$_2$C$_1$-C$_4$ alkyl)—, —N(CO—aryl)—, —N(SO$_2$—aryl)—, or —N(R$_2$)—;

R$_4$, R$_5$, and R$_6$ are hydrogen, C$_1$-C$_4$ alkyl or unsubstituted or substituted phenyl; with the provision that the compound of Formula (I) contains at least one polyester-reactive group.

2. The polyester composition of claim 1, wherein A is selected from one of the following general formulae:

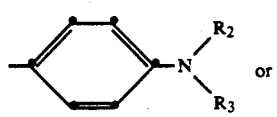

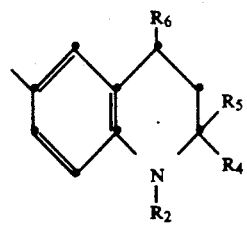

wherein R, R$_2$, R$_3$, R$_4$, R$_5$ and R$_6$ are as defined in claim 1.

3. The polyester composition of claim 1, wherein one polyester reactive group is present on R and another on R$_2$.

4. The polyester composition of claim 1, wherein the residue of Formula (I) is selected from the group consisting of:

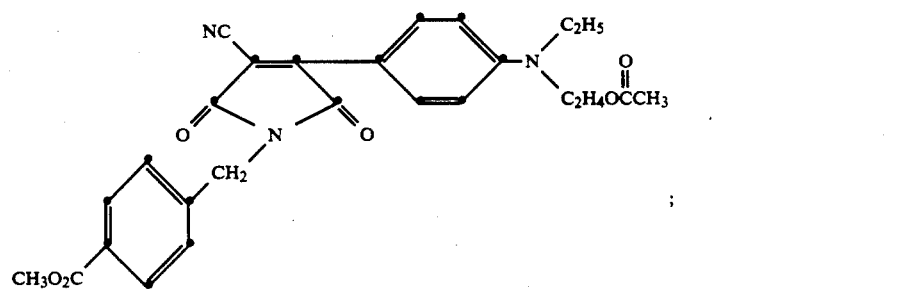

;

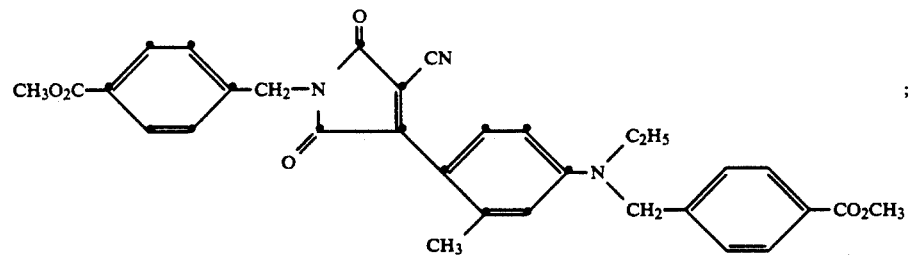

;

and

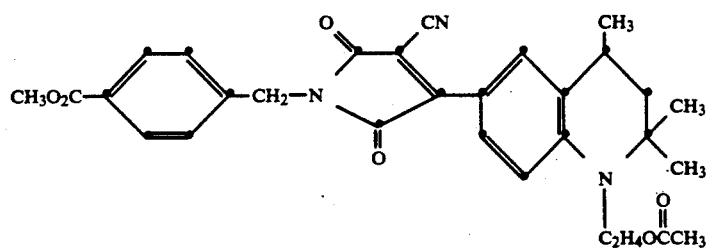

5. The polyester composition of claim 1, wherein the compound of Formula (I) is a residue of a compound of the formula

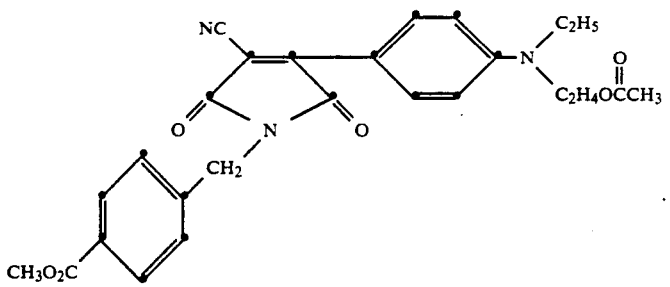

6. A shaped or formed article comprised of the colored polyester composition of claim 1.

7. An amorphous color concentrate comprising an amorphous polyester having copolymerized therein or reacted therewith about 5.0 to 50 weight percent of a residue of Formula (I)

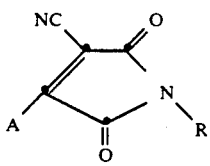 (I)

wherein R is hydrogen, unsubstituted or substituted $C_1$-$C_{10}$ alkyl; unsubstituted or substituted $C_3$-$C_8$ cycloalkyl; $C_3$-$C_8$ alkenyl; $C_3$-$C_8$ alkynyl; phenyl and substituted phenyl;

A is represented by one of the following formulae;

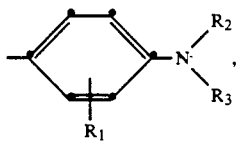

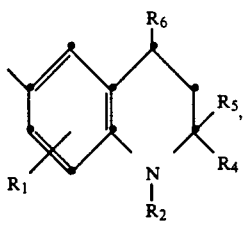

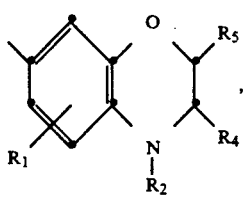

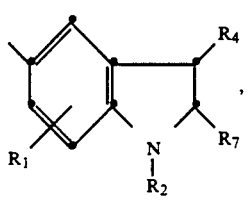

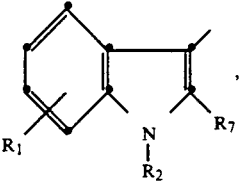

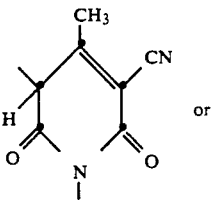

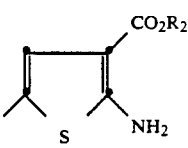

wherein $R_1$ is hydrogen or 1 or 2 groups selected from $C_1$-$C_4$ alkyl, $C_1$-$C_4$ alkoxy, O—$C_1$-$C_4$ alkylene-OH, O—$C_1$-$C_4$ alkylene—$C_1$-$C_4$ alkanoyloxy, —$C_1$-$C_4$ alkylene—OH, $C_1$-$C_4$ alkylene—$C_1$-$C_4$ alkanoyloxy, halogen, $C_1$-$C_4$ alkanoylamino, $C_3$-$C_8$ cycloalkylcarbonylamino, $C_1$-$C_4$ alkylsulfonylamino; arylsulfonylamino, arylaminocarbonylamino or arylcarbonylamino;

$R_2$ and $R_3$ are independently selected from unsubstituted or substituted $C_1$-$C_{10}$ alkyl; unsubstituted or substituted $C_3$-$C_8$ cycloalkyl; $C_3$-$C_8$ alkenyl; $C_3$-$C_8$ alkynyl; unsubstituted or substituted phenyl; or $R_2$ and $R_3$ may be combined with the nitrogen to which they are attached to form an A radical having the formula

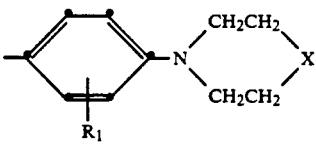

wherein X is selected from a covalent bond, —$CH_2$—, —O—, —S—, —$SO_2$—, —C(L)—, —$CO_2$—, —NH—, —N(CO$C_1$-$C_4$ alkyl)—, —N(-$SO_2C_1$-$C_4$ alkyl)—, —N(CO—aryl)—, —N(-$SO_2$—aryl)—, or —N($R_2$)—;

$R_4$, $R_5$, and $R_6$ are hydrogen or $C_1$-$C_4$ alkyl; and $R_7$ is selected from hydrogen, $C_1$–$C_4$ alkyl or unsubstituted or substituted phenyl; with the provision that the compound of Formula (I) contains at least one polyester-reactive group.

8. The amorphous color concentrate of claim 7 wherein A is selected from one of the following general formulae:

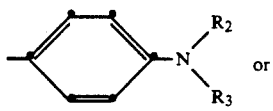 or

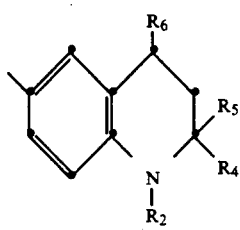

wherein R, $R_2$, $R_3$, $R_4$, $R_5$ and $R_6$ are as defined in claim 5.

9. The amorphous color concentrate of claim 7, wherein one polyester-reactive group is present on R and another on $R_2$.

10. The amorphous color concentrate of claim 7, wherein the residue of Formula (I) is selected from the group consisting of:

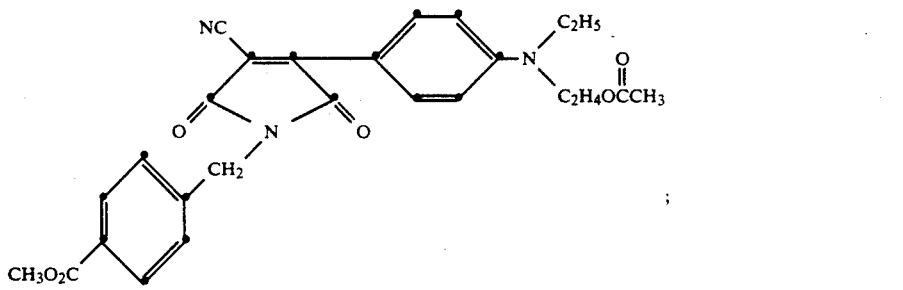

;

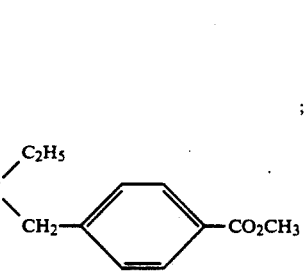

comprising a normally-amorphous polyester which has been modified by dissolution-crystallization-precipitation to impart crystallinity thereto, having copolymerized therein or reacted therewith about 5.0 to 50 weight percent of a residue of Formula (I)

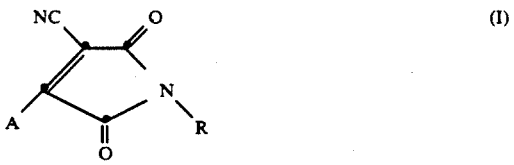 (I)

wherein R is hydrogen, unsubstituted or substituted $C_1$–$C_{10}$ alkyl; unsubstituted or substituted $C_3$–$C_8$ cycloalkyl; $C_3$–$C_8$ alkenyl; $C_3$–$C_8$ alkynyl; phenyl and substituted phenyl;

A is represented by one of the following formulae:

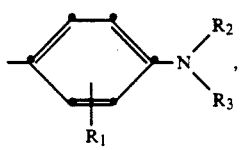, and

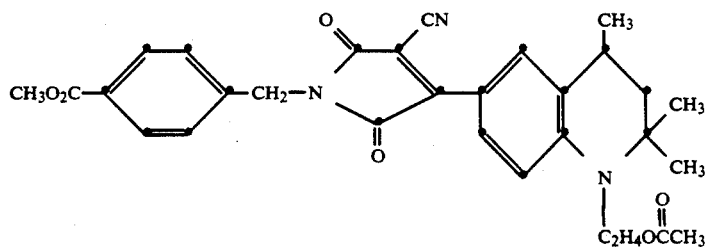

11. A colored semicrystalline powder having an average particle diameter of less than about 50 microns -continued

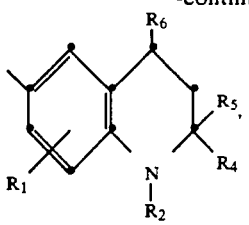

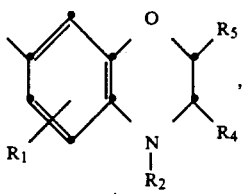

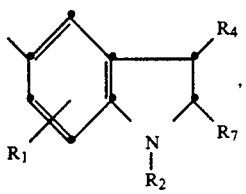

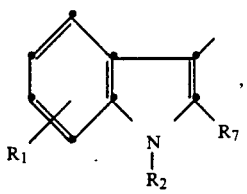

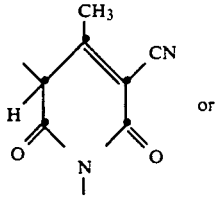

or

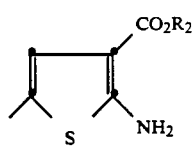

wherein $R_1$ is hydrogen or 1 or 2 groups selected from $C_1$-$C_4$ alkyl, $C_1$-$C_4$ alkoxy, O—$C_1$—$C_4$ alkylene—OH, O—$C_1$—$C_4$ alkylene—$C_1$-$C_4$ alkanoyloxy, $C_1$-$C_4$ alkylene—OH, $C_1$-$C_4$ alkylene—$C_1$-$C_4$ alkanoyloxy, halogen, $C_1$-$C_4$ alkanoylamino, $C_3$-$C_8$ cycloalkylcarbonylamino, $C_1$-$C_4$ alkylsulfonylamino, arylsulfonylamino, arylaminocarbonylamino or arylcarbonylamino;

$R_2$ and $R_3$ are independently selected from unsubstituted or substituted $C_1$-$C_{10}$ alkyl; unsubstituted or substituted $C_3$-$C_8$ cycloalkyl; $C_3$-$C_8$ alkenyl; $C_3$-$C_8$ alkynyl; unsubstituted or substituted phenyl; or $R_2$ and $R_3$ may be combined with the nitrogen to which they are attached to form an A radical having the formula

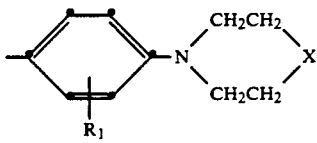

wherein X is selected from a covalent bond, —$CH_2$—, —O—, —S—, —$SO_2$—, —C(O)—, —$CO_2$—, —NH—, —N(CO$C_1$-$C_4$ alkyl)—, —N(-$SO_2C_1$-$C_4$ alkyl)—, —N(CO—aryl)—, —N(-$SO_2$—aryl)—, or —N($R_2$)—;

$R_4$, $R_5$, and $R_6$ are hydrogen or $C_1$-$C_4$ alkyl; and $R_7$ is selected from hydrogen, $C_1$-$C_4$ alkyl or unsubstituted or substituted phenyl; with the provision that the compound of formula (I) contains at least one polyester-reactive group.

12. The semicrystalline color concentrate of claim 11, A is selected from one of the following general formulae:

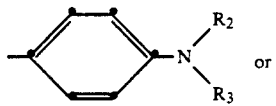 or

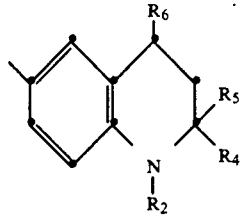

wherein R, $R_2$, $R_3$, $R_4$, $R_5$ and $R_6$ are as defined in claim 13.

13. The semicrystalline color concentrate of claim 11, wherein one polyester reactive group is present on R and another on $R_2$.

14. The semicrystalline color concentrate of claim 11, wherein the residue of Formula (I) is selected from the group consisting of:

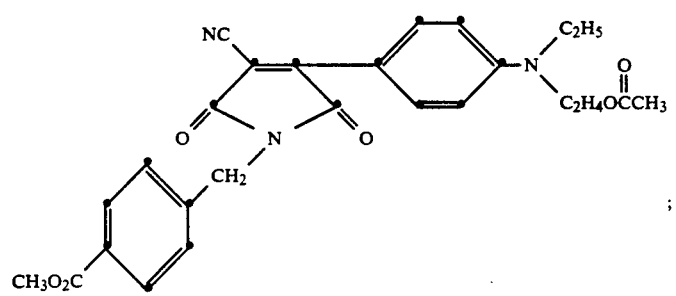

;

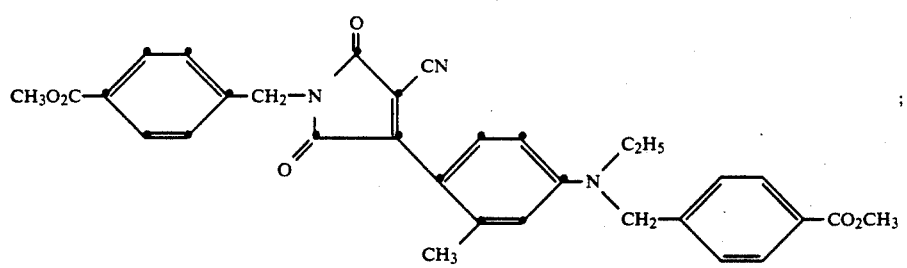
and
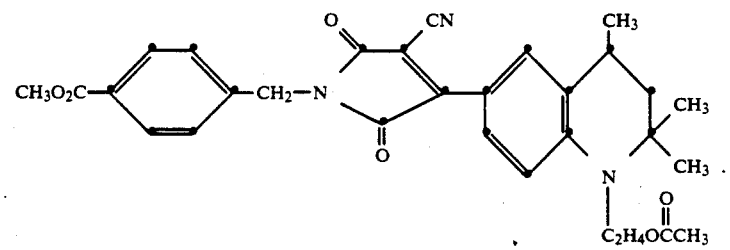

UNITED STATES PATENT AND TRADEMARK OFFICE
CERTIFICATE OF CORRECTION

PATENT NO. : 5,194,571
DATED : March 16, 1993
INVENTOR(S) : Max A. Weaver et al.

It is certified that error appears in the above-identified patent and that said Letters Patent is hereby corrected as shown below:

In Claim 1, Column 56, line 57, "$C_{14}-C_4$" should read ---$C_1-C_4$---.

In Claim 1, Column 57, line 14, --- or --- should be inserted after "hydrogen".

In Claim 1, Column 57, line 14, --- ; and $R_7$ is selected from hydrogen, $C_1-C_4$ alkyl --- should be inserted after "alkyl".

In Column 60, line 64, "——C(L)——" should read --- ——C(O)—— ---.

In Column 61, line 25, "5." should be --- 7. ---.

Signed and Sealed this

Fourth Day of April, 1995

Attest:

BRUCE LEHMAN

Attesting Officer      Commissioner of Patents and Trademarks